(12) United States Patent
Jung et al.

(10) Patent No.: US 12,381,502 B2
(45) Date of Patent: Aug. 5, 2025

(54) HOME APPLIANCE INCLUDING MOTOR AND CONTROL METHOD FOR HOME APPLIANCE

(71) Applicant: Samsung Electronics Co., Ltd., Suwon-si (KR)

(72) Inventors: Bumun Jung, Suwon-si (KR); Heunggyun Roh, Suwon-si (KR); Taeho Yoon, Suwon-si (KR); Sangmin Lee, Suwon-si (KR); Namhyoung Kim, Suwon-si (KR); Namkyu Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/236,110

(22) Filed: Aug. 21, 2023

(65) Prior Publication Data
US 2024/0079983 A1    Mar. 7, 2024

Related U.S. Application Data

(63) Continuation of application No. PCT/KR2023/012264, filed on Aug. 18, 2023.

(30) Foreign Application Priority Data

Aug. 24, 2022    (KR) .................. 10-2022-0106340
Sep. 19, 2022    (KR) .................. 10-2022-0118162

(51) Int. Cl.
*H02P 23/14*    (2006.01)
*H02P 3/22*    (2006.01)
(Continued)

(52) U.S. Cl.
CPC ............... *H02P 23/14* (2013.01); *H02P 3/22* (2013.01); *H02P 6/24* (2013.01); *H02P 6/28* (2016.02); *H02P 27/06* (2013.01)

(58) Field of Classification Search
CPC .... H02P 23/14; H02P 3/22; H02P 6/24; H02P 6/28; H02P 27/06; H02P 3/18; H02P 21/0025; H02P 21/20; H02P 21/18
(Continued)

(56) References Cited

U.S. PATENT DOCUMENTS 6,531,839 B1    3/2003    Shin et al.
6,650,083 B2    11/2003    Jung
(Continued)

FOREIGN PATENT DOCUMENTS

JP    2006-296066    10/2006
JP    2010-193648    9/2010
(Continued)

OTHER PUBLICATIONS

Notification of Transmittal of the International Search Report and the Written Opinion of the International Searching dated Nov. 22, 2003 issued in PCT Application No. PCT/KR2023/012264.
(Continued)

*Primary Examiner* — David Luo
(74) *Attorney, Agent, or Firm* — STAAS & HALSEY LLP

(57) ABSTRACT

A control method for a home appliance including a motor that is driven by a driving current. The control method includes (a) receiving a stop signal to stop the motor, (b) based on receiving the stop signal, performing open brake control that stops supply of the driving current to the motor, (c) based on a motor phase current of the motor at a start of the open brake control, estimating an initial motor speed of the motor at the start of the open brake control, (d) based on the estimated initial motor speed, determining a start time point of short brake control that applies a torque in a reverse direction to a rotation direction of the motor, and (e)
(Continued)

performing the short brake control at the determined start time point of the short brake control.

20 Claims, 20 Drawing Sheets

(51) Int. Cl.
    *H02P 6/24*         (2006.01)
    *H02P 6/28*         (2016.01)
    *H02P 27/06*       (2006.01)

(58) Field of Classification Search
    USPC .......................................... 318/400.01, 700
    See application file for complete search history.

(56) References Cited

U.S. PATENT DOCUMENTS

| | | |
|---|---|---|
| 6,831,432 B2 | 12/2004 | Murakami |
| 6,922,032 B2 | 7/2005 | Maeda |
| 7,615,947 B2 * | 11/2009 | Tamaoka ................ G11B 19/22 318/365 |
| 8,525,464 B2 * | 9/2013 | Tanaka ...................... G01P 3/48 318/807 |
| 9,705,438 B2 * | 7/2017 | Zhao ....................... H02P 21/26 |
| 9,954,473 B2 | 4/2018 | Je et al. |
| 10,177,691 B2 | 1/2019 | Eshleman et al. |
| 11,146,188 B2 * | 10/2021 | Yamamoto ................ H02P 3/22 |

FOREIGN PATENT DOCUMENTS

| | | |
|---|---|---|
| JP | 4661188 | 3/2011 |
| JP | 2018-42297 | 3/2018 |
| JP | 6405687 | 10/2018 |
| KR | 10-0374832 | 3/2003 |
| KR | 10-2003-0046328 | 6/2003 |
| KR | 10-0406875 | 11/2003 |
| KR | 10-2004-0068872 | 8/2004 |
| KR | 10-1691793 | 1/2017 |
| KR | 10-2017-0127756 | 11/2017 |

OTHER PUBLICATIONS

International Search Report, PCT/ISA/210, dated Nov. 22, 2023, in PCT Application No. PCT/KR2023/012264.
Written Opinion, PCT/ISA/237, dated Nov. 22, 2023, in PCT Application No. PCT/KR2023/012264.

\* cited by examiner

HOME APPLIANCE INCLUDING MOTOR AND CONTROL METHOD FOR HOME APPLIANCE

CROSS-REFERENCE TO RELATED APPLICATIONS

This is a continuation application, filed under 35 U.S.C. § 111 (a), of International Application PCT/KR2023/012264, filed Aug. 18, 2023, it being further noted that foreign priority benefit is based upon Korean Patent Application Nos. 10-2022-0106340, filed Aug. 24, 2022, and 10-2022-0118162, filed Sep. 19, 2022, in the Korean Intellectual Property Office, the disclosures of which are incorporated by reference herein in their entireties.

TECHNICAL FIELD

An embodiment of the disclosure relate to a home appliance including a motor, a control method for the home appliance, and a computer-readable recording medium having recorded thereon a program executable by a computer to perform the control method for the home appliance.

BACKGROUND ART

Home appliances such as refrigerators and air conditioners may include a motor for driving a compressor. For example, home appliances may use a motor such as a brushless three-phase permanent magnet synchronous motor. In order to drive the brushless three-phase permanent magnet synchronous motor, motor phase current and motor speed sensors are necessary. However, motor speed sensors may not be installed inside compressors used in products such as refrigerators and air conditioners. Also, three current sensors should be used for three-phase current sensing. However, for low cost, small size, and small volume, a circuit for sensing a three-phase current using one current sensor in a direct current link has been widely applied to household products.

DESCRIPTION OF EMBODIMENTS

Technical Solution to Problem

According to an embodiment of the disclosure, a control method is provided for a home appliance including a motor that is driven by a driving current, the control method including receiving a stop signal to stop the motor; based on receiving the stop signal, performing open brake control that stops supply of the driving current to the motor; based on a motor phase current of the motor at a start of the open brake control, estimating an initial motor speed of the motor at the start of the open brake control; based on the estimated initial motor speed, determining a start time point of short brake control that applies a torque in a reverse direction to a rotation direction of the motor; and performing the short brake control at the determined start time point of the short brake control.

According to an embodiment of the disclosure, the motor is a brushless three-phase permanent magnet synchronous motor.

According to an embodiment of the disclosure, the driving current is an alternating current driving current, the motor receives the driving current from an inverter to which a current is input from a direct current power supply, and the method further includes measuring the motor phase current of the motor at the start of the open brake control by measuring the current that is input to the inverter from the direct current power supply.

According to an embodiment of the disclosure, the motor is configured to drive a compressor, and the determining of the start time point of the short brake control includes repeatedly estimating a motor speed of the motor that decreases from the initial motor speed, and determining the start time point of the short brake control so that the short brake control is started after a time point when the estimated motor speed decreases to a reference speed value or less.

According to an embodiment of the disclosure, the control method further includes measuring a suction pressure value of the compressor; and measuring a discharge pressure value of the compressor, wherein the repeatedly estimating of the motor speed incudes repeatedly estimating the motor speed based on the estimated motor speed, the measured suction pressure value, and the measured discharge pressure value.

According to an embodiment of the disclosure, the repeatedly estimating of the motor speed further includes calculating a load torque of the motor based on a difference between the measured suction pressure value and the measured discharge pressure value, and repeatedly estimating the motor speed based on a sum of the calculated load torque of the motor and a friction torque of the motor, the estimated motor speed, a friction coefficient of the motor, and an integral value of an inertial moment of the motor.

According to an embodiment of the disclosure, the determining of the start time point of the short brake control includes, based on a lookup table including an estimated motor speed value according to a current motor speed, a suction pressure, and a discharge pressure, repeatedly estimating the motor speed from the estimated motor speed value, the measured suction pressure value, and the measured discharge pressure value, and determining the start time point of the short brake control so that the short brake control is started after the time point when the estimated motor speed decreases to the reference speed value or less.

According to an embodiment of the disclosure, the motor is configured to drive a compressor, and the control method further includes measuring a suction pressure value of the compressor, and measuring a discharge pressure value of the compressor, and the determining of the start time point of the short brake control includes, based on a lookup table including a short brake switching time value according to a current motor speed, a suction pressure, and a discharge pressure, determining the start time point of the short brake control from the initial motor speed, the measured suction pressure value, and the measured discharge pressure value.

According to an embodiment of the disclosure, the performing of the open brake control includes stopping supply of the driving current to the motor by turning off a switch of an inverter configured to drive the motor.

According to an embodiment of the disclosure, the performing of the short brake control includes generating a closed loop between the motor and a circuit of an inverter configured to drive the motor, by turning on some switches of the inverter.

According to an embodiment of the disclosure, a home appliance includes a motor; an inverter configured to output an alternating current driving current to the motor by generating an alternating current from a direct current power supply; a current sensor configured to measure a motor phase current of the motor; a memory storing at least one instruction; and at least one processor configured to execute the at least one instruction to (a) receive a stop signal to stop the motor, (b) based on receiving the stop signal, perform open brake control that stops supply of the driving current to the motor, (c) based on the motor phase current measured by the current sensor at a start of the open brake control, estimate an initial motor speed of the motor at the start of the open brake control, (d) based on the estimated initial motor speed, determine a start time point of short brake control that applies a torque in a reverse direction to a rotation direction of the motor, and (e) perform the short brake control at the determined start time point of the short brake control.

According to an embodiment of the disclosure, the motor is a brushless three-phase permanent magnet synchronous motor.

According to an embodiment of the disclosure, the current sensor is configured to measure a current that is input to the inverter from the direct current power supply, to measure the motor phase current.

According to an embodiment of the disclosure, the home appliance further includes a compressor that is driven by the motor, wherein the at least one processor is further configured to execute the at least one instruction to repeatedly estimate a motor speed of the motor that decreases from the initial motor speed, and determine the start time point of the short brake control so that the short brake control is started after a time point when the estimated motor speed decreases to a reference speed value or less.

According to an embodiment of the disclosure, the home appliance further includes a first pressure gauge configured to measure a suction pressure value of the compressor; and a second pressure gauge configured to measure a discharge pressure value of the compressor, wherein the at least one processor is further configured to execute the at least one instruction to repeatedly estimate the motor speed based on the estimated motor speed, the measured suction pressure value, and the measured discharge pressure value.

According to an embodiment of the disclosure, the at least one processor is further configured to execute the at least one instruction to calculate a load torque of the motor based on a difference between the measured suction pressure value and the measured discharge pressure value, and repeatedly estimate the motor speed based on a sum of the calculated load torque of the motor and a friction torque of the motor, the estimated motor speed, a friction coefficient of the motor, and an integral value of an inertial moment of the motor.

According to an embodiment of the disclosure, the home appliance further includes a compressor that is driven by the motor; a first pressure gauge configured to measure a suction pressure value of the compressor, and a second pressure gauge configured to measure a discharge pressure value of the compressor, wherein the at least one processor is further configured to execute the at least one instruction to, based on a lookup table including an estimated motor speed value according to a current motor speed, a suction pressure, and a discharge pressure, repeatedly estimate the motor speed from the estimated motor speed value, the measured suction pressure value, and the measured discharge pressure value, and determine the start time point of the short brake control so that the short brake control is started after the time point when the estimated motor speed decreases to a reference speed value or less.

According to an embodiment of the disclosure, the home appliance further includes a compressor that is driven by the motor; a first pressure gauge configured to measure a suction pressure value of the compressor; and a second pressure gauge configured to measure a discharge pressure value of the compressor, wherein the at least one processor is further configured to execute the at least one instruction to, based on a lookup table including a short brake switching time value according to a current motor speed, a suction pressure, and a discharge pressure, determine the start time point of the short brake control from the initial motor speed, the measured suction pressure value, and the measured discharge pressure value.

According to an embodiment of the disclosure, the at least one processor is further configured to execute the at least one instruction to perform the open brake control by turning off a switch of the inverter to stop supply of the driving current to the motor, and perform the short brake control by turning on some of switches of the inverter and generating a closed loop between the motor and a circuit of the inverter.

According to an embodiment of the disclosure, a non-transitory computer-readable recording medium is provided, and has recorded thereon a program that is executable by a computer to perform the control method described above.

MODE OF DISCLOSURE

Figure 1:
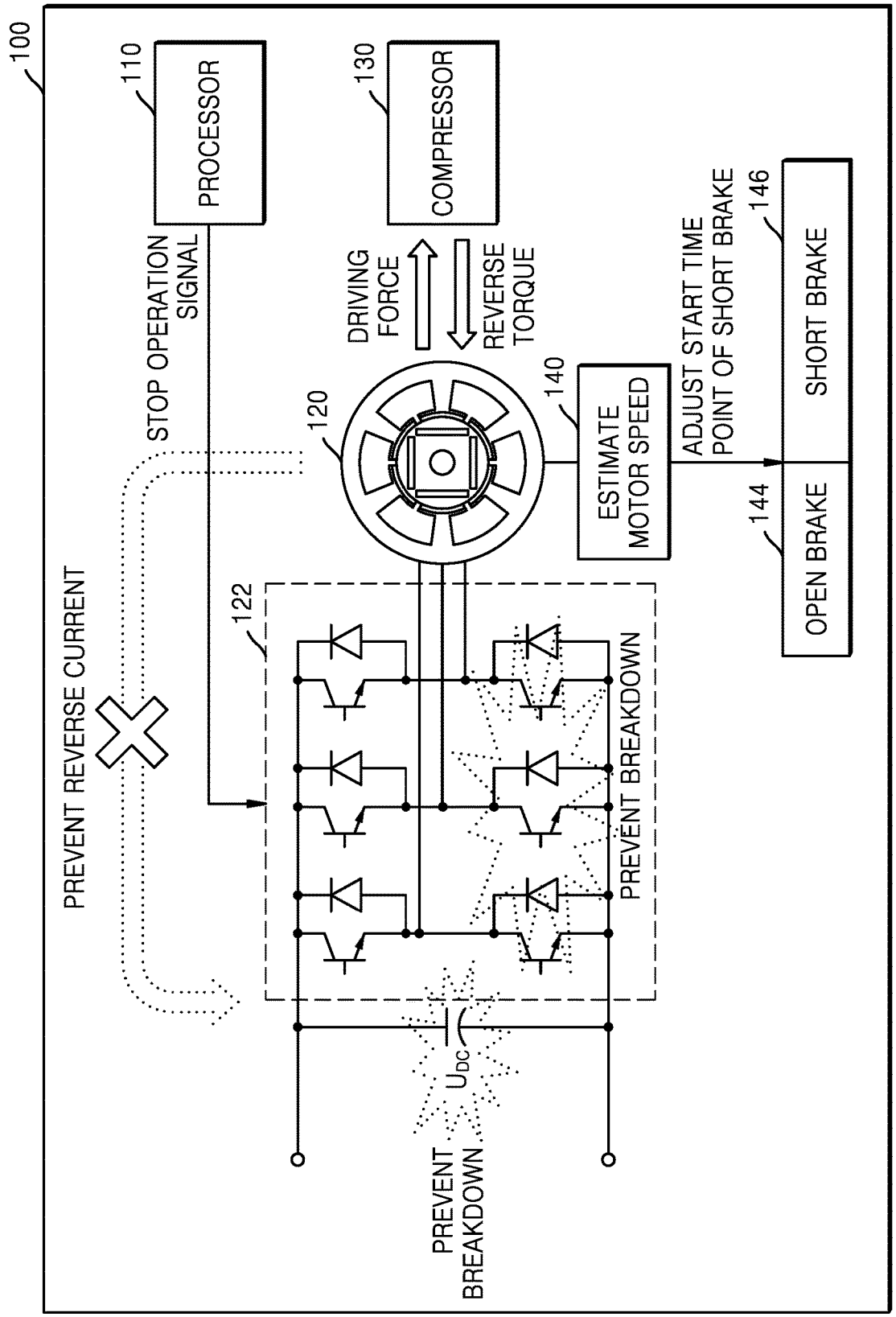
FIG. 1 is a diagram illustrating an operation of a motor according to an embodiment of the disclosure.

Throughout the disclosure, the expression "at least one of a, b or c" indicates only a, only b, only c, both a and b, both a and c, both b and c, all of a, b, and c, or variations thereof.

The specification clarifies the scope of the claims, and the principles of embodiments of the disclosure are described and set forth herein, such that those of ordinary skill in the art to which the embodiments of the disclosure belong may practice the embodiments of the disclosure described in the claims. The embodiments of the disclosure may be implemented in various forms.

Like reference numerals denote like components throughout the specification. The specification does not describe all elements of the embodiments of the disclosure, and general description in the technical field to which the embodiments of the disclosure belong, or redundant description in the embodiments the disclosure will not be provided herein. The term "module" or "unit" used herein may be implemented as one or a combination of two or more of software, hardware, or firmware, and according to the embodiments of the disclosure, a plurality of "modules" or "units" may be implemented as one element, or one "module" or "unit" may include a plurality of elements.

In the description of the embodiment of the disclosure, when it is determined that a detailed description of a related known technology may unnecessarily obscure the subject matter of the disclosure, the detailed description thereof will not be provided herein. Also, numerals (e.g., first and second) used in the description of the specification are merely identifiers for identifying one component from another component.

In addition, as used herein, when a component is referred to as "connected" to another component, it will be understood that the one component may be directly connected to the other component, but may be connected to the other component with another component therebetween, unless otherwise described.

Hereinafter, the working principles of the embodiments of the disclosure and various embodiments of the disclosure will be described with reference to the accompanying drawings.

FIG. 1 is a diagram illustrating an operation of a motor according to an embodiment of the disclosure.

Embodiments of the disclosure relate to a home appliance 100 including a motor 120. The home appliance 100 may be implemented in a form of, for example, a refrigerator, an air conditioner, a dryer, a dehumidifier, a clothes management apparatus, a shoe management apparatus, or the like. The home appliance 100 performs operations such as temperature control and drying, by using a compressor 130. The home appliance 100 may include the motor 120 that drives the compressor 130. The motor 120 may supply a driving force for driving the compressor 130. The home appliance 100 may turn on/off the compressor 130 and the motor 120 to perform operations such as temperature control and drying. The home appliance 100 outputs a stop signal to the motor 120 to stop the operation of the compressor 130 and the motor 120.

The motor 120 stops in response to the stop signal. An inverter 122 that controls the motor 120 may receive, from a processor 110, a stop driving signal for controlling the motor 120 to stop. The inverter 122 that drives the motor 120 may perform a stop operation of stopping the motor 120 in response to the stop driving signal. Methods of stopping the motor 120 may include open brake control 144 and short brake control 146.

The open brake control 144 is an operation of stopping supply of a driving current to the motor 120 by opening all switches of the inverter 122 that supplies a driving current to the motor 120 to drive the motor 120. When the open brake control 144 is performed, the motor 120 free-runs and stops.

The short brake control 146 stops the motor 120 by applying a reverse torque to a rotation direction of the motor 120. The short brake control 146 may turn on some of a plurality of switches of the inverter 122 and turn others off, form a closed loop between the motor 120 and the inverter 122, and apply a reverse torque to the motor 120.

According to an embodiment of the disclosure, when the motor 120 is stopped, the open brake control 144 is first performed, and the short brake control 146 is started at a dynamically determined time point. A time point of performing the short brake control 146 while the open brake control 144 is performed is dynamically performed by the home appliance 100 based on a speed of the motor 120 at the start of the stop operation. The home appliance 100 may estimate the speed of the motor 120 (140) and determine a start time point of the short brake control 146 based on the estimated speed of the motor 120. The home appliance 100 determines the start time point of the short brake control 146, such that the short brake control 146 is started after the speed of the motor 120 decreases to a reference speed value or below.

When the open brake control 144 is performed, the motor 120 may reversely rotate due to a pressure difference between a suction portion and a discharge portion of the compressor 130. During the open brake control 144, a reverse torque may be applied from the compressor 130 to the motor 120 due to the pressure difference between the suction portion and the discharge portion of the compressor 130. When the motor 120 reversely rotates due to the reverse torque, a counter electromotive force voltage may be generated in proportion to a reverse rotation speed of the motor 120. As the counter electromotive force voltage charges a direct current (DC) link capacitor $U_{DC}$, a DC link voltage may increase. When the motor 120 reversely rotates due to a counter electromotive force while the motor 120 free-runs due to the open brake control 144, the motor 120 may serve as a generator to increase a DC voltage at both ends of the DC link capacitor $U_{DC}$ while a current flows through a diode of the inverter 122. The DC link capacitor $U_{DC}$ may be damaged when a DC link voltage exceeds a rated voltage of the DC link capacitor $U_{DC}$ in a process in which the DC link voltage increases. According to an embodiment of the disclosure, by performing open brake control 144 until the speed of the motor 120 reaches the reference speed value and switching to the short brake control 146, the DC link capacitor $U_{DC}$ that occurs during the open brake control 144 may be prevented from being broken down.

In addition, the short brake control 146 applies a reverse torque to the rotating motor 120 and stops the motor 120. When the motor 120 rotating at a high speed is stopped using short brake control 146, a current flowing to the DC link capacitor $U_{DC}$ is blocked, but a large braking current flows to a power switch or diode of the inverter 122. In this case, when the braking current exceeds a rated level of the power switch or diode of the inverter 122, the inverter 122 may be damaged. Also, when the short brake control 146 is applied to the inverter 122 using a single DC link current sensor, there is no current sensor in a motor phase current path, and thus, a motor current may not be sensed. According to an embodiment of the disclosure, in order to prevent excessive breakdown current during the short brake control 146, the short brake control 146 is applied after the rotation speed of the motor 120 is reduced by the open brake control 144. When a timing to enter the short brake control 146 after the open brake control 144 is set to be constant, the speed of the motor 120 when entering the short brake control 146 changes according to an operation speed of the motor 120 before the stop signal is input and a difference between a suction pressure and a discharge pressure. In an embodiment of the disclosure, a start time point of switching from the open brake control 144 to the short brake control 146 is dynamically adjusted, such that the short brake control 146 is started at the same motor speed.

According to an embodiment of the disclosure, by performing the open brake control 144 only until the motor speed reaches the reference speed value, the DC link capacitor UDC may be prevented from being broken down due to a reverse current. Also, according to an embodiment of the disclosure, by starting the short brake control 146 when the motor speed reaches the reference speed value, a switch or diode of the inverter 122 may be prevented from being broken down due to excessive braking current.

Figure 2:
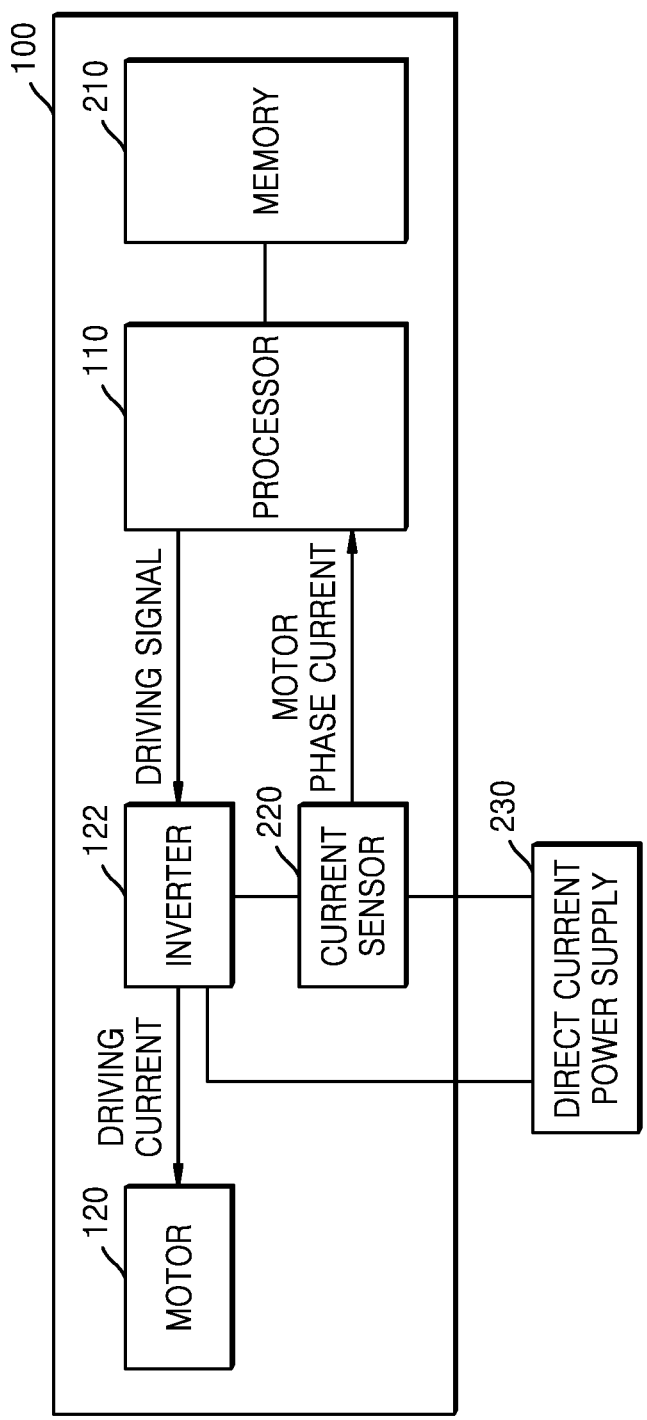
FIG. 2 is a diagram of a structure of a home appliance according to an embodiment of the disclosure.

FIG. 2 is a diagram of a structure of a home appliance according to an embodiment of the disclosure.

According to an embodiment of the disclosure, the home appliance 100 may include the processor 110, the motor 120, the inverter 122, a memory 210, and a current sensor 220.

The processor 110 controls the overall operation of the home appliance 100. The processor 110 may be implemented as one or more processors. The processor 110 may perform a certain operation by executing an instruction or command stored in the memory 210. Also, the processor 110 controls the operation of components provided in the home appliance 100. The processor 110 may include at least one or a combination of a central processing unit (CPU), a graphics processing unit (GPU), or a neural processing unit (NPU).

The motor 120 outputs a driving force to a certain home appliance function module of the home appliance 100. The motor 120 may operate by receiving a driving current from the inverter 122. The motor 120 may be a brushless three-phase permanent magnet synchronous motor.

The inverter 122 supplies the driving current to the motor 120 to drive the motor 120. The inverter 122 maintains a torque and controls a speed of the motor 120. The inverter 122 receives DC power, generates an alternating current driving current by a switching operation, and outputs the driving current to the motor 120. The inverter 122 may include the DC link capacitor $U_{DC}$, a plurality of switches, and a plurality of diodes. The inverter 122 generates a three-phase driving current and outputs the same to the motor 120 by controlling on/off of the plurality of switches.

The processor 110 generates a driving signal for driving the inverter 122 and outputs the driving signal. The processor 110 may adjust the driving signal of the inverter 122 to adjust a rotation speed of the motor 120. The processor 110 may adjust the rotation speed of the motor 120 by adjusting a switching frequency of a switch of the inverter 122.

The memory 210 stores various pieces of information, data, instructions, and programs necessary for the operation of the home appliance 100. The memory 210 may include at least one or a combination of a volatile memory or a nonvolatile memory. The memory 210 may include at least one type of storage medium among a flash memory type memory, a hard disk type memory, a multimedia card micro type memory, a card type memory (e.g., a secure digital (SD) or extreme digital (XD) memory), random access memory (RAM), static RAM (SRAM), read-only memory (ROM), electrically erasable programmable ROM (EEPROM), PROM, a magnetic memory, a magnetic disk, and an optical disk. Also, the memory 210 may correspond to a web storage or a cloud server that performs a storage function on the Internet.

The current sensor 220 measures a current between the inverter 122 and a DC power supply 230. According to an embodiment of the disclosure, the current sensor 220 may be between a cathode of the DC power supply 230 and the inverter 122. A current detected by the current sensor 220 in a state in a motor operation state in which the motor 120 supplies a driving force to the compressor 130 corresponds to a motor phase current supplied to the motor 120. The motor phase current has a correlation with the rotation speed of the motor 120. Accordingly, the processor 110 may calculate the rotation speed of the motor 120 based on the motor phase current detected by the current sensor 220 while the motor 120 operates. However, in a motor stop state in which a current is not supplied to the motor 120, a current is not supplied from the DC power supply 230 to the inverter 122. Accordingly, in the motor stop state, a current flowing through the inverter 122 and the motor 120 may not be measured even by the current sensor 220.

The DC power supply 230 may correspond to a power module (1980 of FIG. 19) of the home appliance 100. The power module receives power from an external power source, converts the power to a rated voltage and a current of the home appliance 100, and supplies a driving current to each component.

When the processor 110 stops the motor 120, the processor 110 generates a stop driving signal for stopping the motor 120 and outputs the stop driving signal to the inverter 122. The stop driving signal includes an open brake driving signal and a short brake driving signal. The processor 110 generates the stop driving signal while a motor stop operation is performed, and outputs the stop driving signal to the inverter 122.

The processor 110 estimates the speed of the motor 120 based on the motor phase current. The processor 110 obtains a motor phase current value measured by the current sensor 220 when the stop driving signal is output. The processor 110 estimates an initial motor speed corresponding to a motor speed at the start of the stop operation by using the motor phase current value when the stop driving signal is output. The processor 110 may estimate the initial motor speed from the motor phase current value by using a function or lookup table for a correlation between the motor phase current value and the motor speed. The memory 210 may store in advance the function or lookup table for a correlation between the motor phase current value and the motor speed. The processor 110 may use the function or lookup table for a correlation between the motor phase current value and the motor speed, which is stored in the memory 210.

The processor 110 determines a start time point of short brake control based on the initial motor speed. The processor 110 determines the start time point of the short brake control, such that the short brake control is started when the motor speed reaches the reference speed value. When the start time point of the short brake control is determined, the processor 110 switches from open brake control to the short brake control at the determined start time point of the short brake control. The processor 110 generates a short brake driving signal for the short brake control and outputs the short brake driving signal to the inverter 122.

The processor 110 terminates the motor stop operation after the short brake control is performed, after a certain period of time elapses, or after the motor 120 stops.

Figure 3:
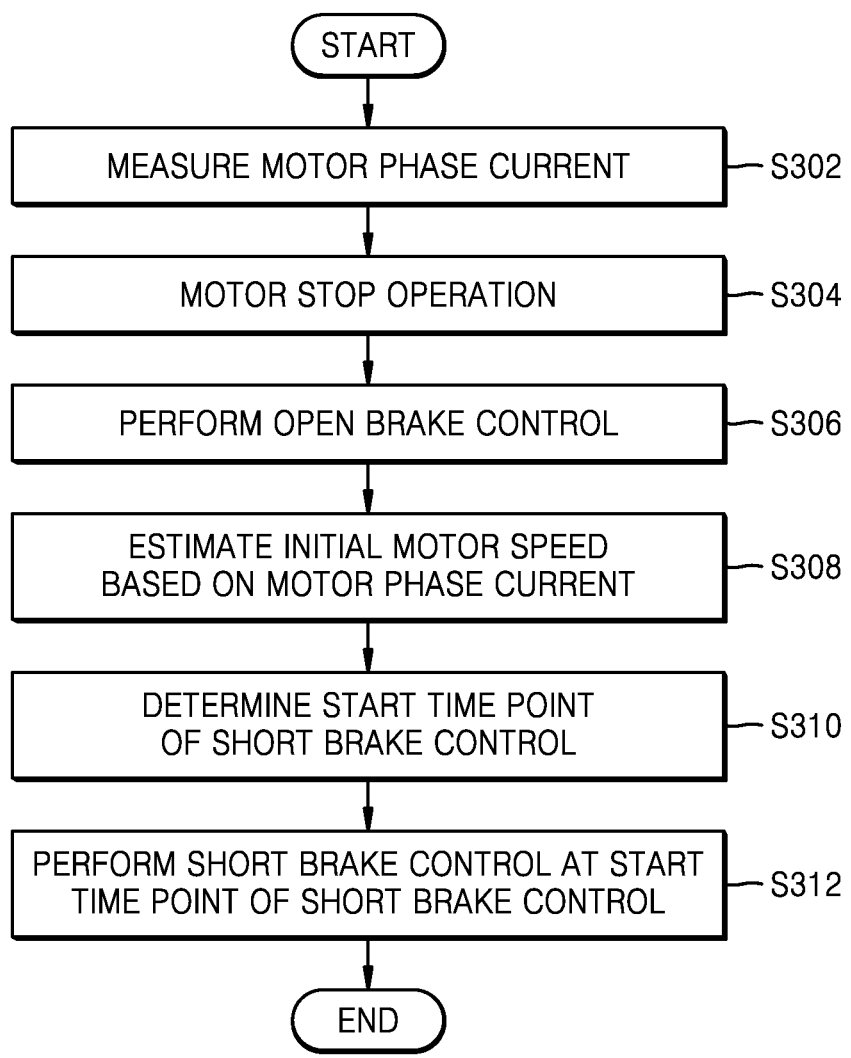
FIG. 3 is a flowchart of a control method for a home appliance, according to an embodiment of the disclosure.

FIG. 3 is a flowchart of a control method for a home appliance, according to an embodiment of the disclosure.

In the control method for the home appliance, according to an embodiment of the disclosure, a home appliance including a motor is controlled. In the disclosure, an embodiment of the disclosure in which the home appliance 100 according to embodiments of the disclosure performs the control method for the home appliance will be mainly described. Accordingly, embodiments of the disclosure described for the home appliance 100 are applicable to embodiments of the disclosure for the control method for the home appliance. In contrast, the embodiments of the disclosure described for the control method for the home appliance are applicable to the embodiments of the disclosure for the home appliance 100. The control method for the home appliance according to the embodiments of the disclosure is not limited to the embodiment of the disclosure performed by the home appliance 100 set forth in the disclosure, and may be performed by various types of home appliances.

In operation S302, the home appliance 100 measures a motor phase current while driving the motor 120. The home appliance 100 measures a current flowing between the DC power supply 230 and the inverter 122 by using the current sensor 220.

Next, in operation S304, the home appliance 100 performs a motor stop operation to stop the motor 120. The home appliance 100 may use the motor 120 to drive a component such as a compressor. For example, the home appliance 100 controls the compressor for operations such as temperature control and humidity control. The home appliance 100 may turn on/off the compressor according to a set temperature or set humidity. The home appliance 100 may stop the operation of the compressor for temperature control or humidity control while the compressor operates. As described above, in order to stop the operation of the compressor, the home appliance 100 may stop the motor 120.

Next, in operation S306, the home appliance 100 performs open brake control. The home appliance 100 first performs the open brake control to perform the motor stop operation. The processor 110 generates an open brake driving signal and outputs the same to the inverter 122. The inverter 122 opens all switches of the inverter 122 by receiving the open brake driving signal. Because all the switches of the inverter 122 are open, a driving current is not output from the inverter 122 to the motor 120. The motor 120 rotates in a free-run state without a driving current.

Next, in operation S308, the home appliance 100 estimates the initial motor speed, which is the motor speed at the start of the open brake control, based on the motor phase current at the start of the open brake control. The home appliance 100 may estimate the initial motor speed from the motor phase current by using a predefined function or lookup table.

Next, in operation S310, the home appliance 100 determines a start time point of short brake control based on the initial motor speed. The start time point of the short brake control is determined as a time point when the motor speed reaches the reference speed value. According to an embodiment of the disclosure, the home appliance 100 may estimate the motor speed based on the initial motor speed, determine whether the motor speed reaches the reference speed value, and determine the start time point of the short brake control. Also, according to an embodiment of the disclosure, the home appliance 100 may determine the start time point of the short brake control from the initial motor speed by using the lookup table.

Next, in operation S312, the home appliance 100 switches from the open brake control to the short brake control at the start time point of the short brake control. The home appliance 100 generates a short brake control driving signal for the short brake control, and outputs the short brake control driving signal to the inverter 122. The inverter 122 receives the short brake control driving signal, applies a reverse torque to the motor 120, and stops the motor 120.

Figure 4:
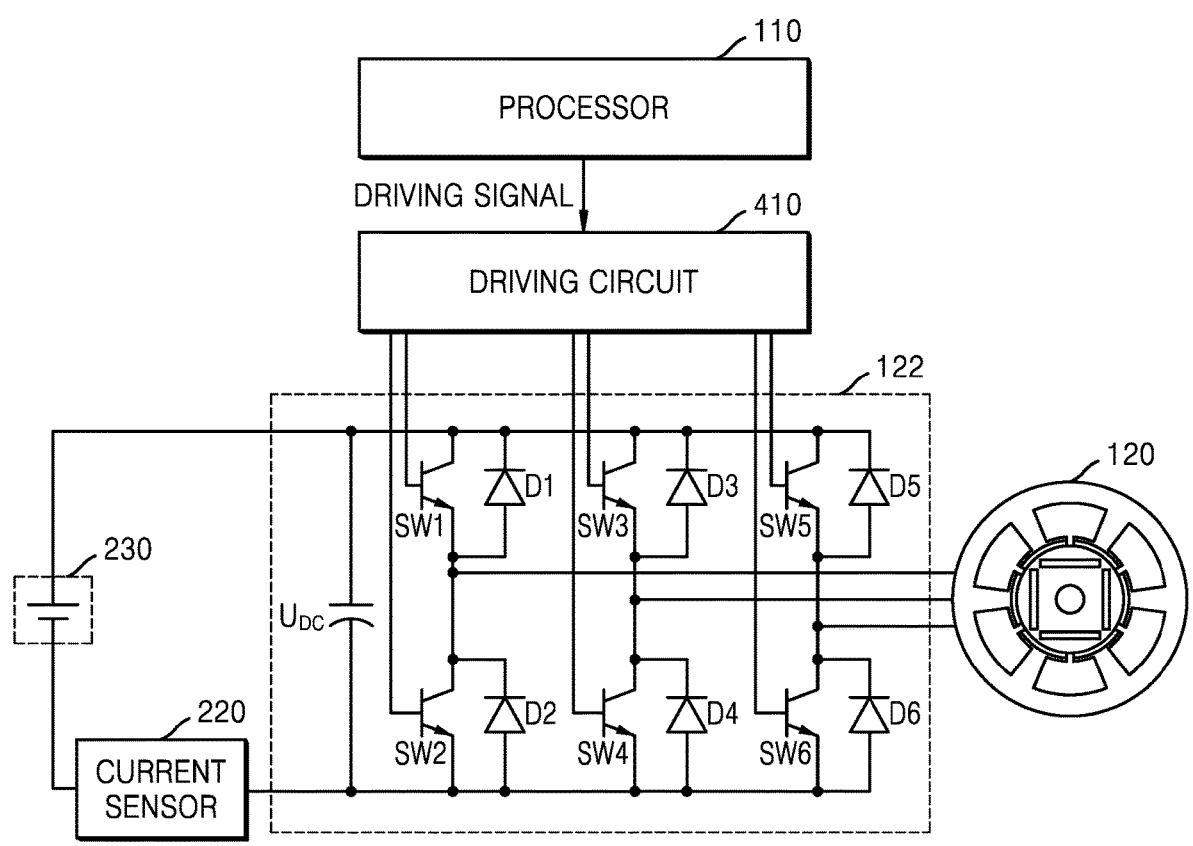
FIG. 4 is a diagram of a structure of an inverter and a motor according to an embodiment of the disclosure.

FIG. 4 is a diagram of a structure of an inverter and a motor according to an embodiment of the disclosure.

According to an embodiment of the disclosure, the inverter 122 may include a plurality of switches (SW1, SW2, SW3, SW4, SW5, and SW6), a plurality of diodes (D1, D2, D3, D4, D5, and D6), and the DC link capacitor $U_{DC}$. The plurality of switches SW1, SW2, SW3, SW4, SW5, and SW6 are connected in parallel with the diodes D1, D2, D3, D4, D5, and D6, respectively. A first switch SW1 is connected in parallel with a first diode D1, and a second switch SW2 is connected in parallel with a second diode D2. The third switch SW3 is connected in parallel with the third diode D3, and the fourth switch SW4 is connected in parallel with the fourth diode D4. The fifth switch SW5 is connected in parallel with the fifth diode D5, and the sixth switch SW6 is connected in parallel with the sixth diode D6.

The plurality of switches SW1, SW2, SW3, SW4, SW5, and SW6 perform an on/off operation by receiving a driving signal output from a driving circuit 410. The driving circuit 410 generates a driving signal to be output to the plurality of switches SW1, SW2, SW3, SW4, SW5 and SW6 by receiving the driving signal from the processor 110. The driving circuit 410 generates a driving signal for determining an on/off timing of each of the switches SW1, SW2, SW3, SW4, SW5, and SW6 and outputs the driving signal to each of the switches SW1, SW2, SW3, SW4, SW5, and SW6. For example, the plurality of switches SW1, SW2, SW3, SW4, SW5, and SW6 may correspond to transistors.

A first-phase driving current is generated by an on/off operation of the first switch SW1 and the second switch SW2. A second-phase driving current is generated by an on/off operation of the third switch SW3 and the fourth switch SW4. A third-phase driving current is generated by an on/off operation of the fifth switch SW5 and the sixth switch SW6. The first-phase driving current, the second-phase driving current, and the third-phase driving current are output to the motor 120. The motor 120 rotates by receiving the first-phase driving current, the second-phase driving current, and the third-phase driving current from the inverter 122.

The inverter 122 receives a power supply voltage from the DC power supply 230. The DC link capacitor $U_{DC}$ is positioned across both ends of a DC power supply voltage.

The current sensor 220 is between the DC power supply 230 and the inverter 122 and measures a current between the DC power supply 230 and the inverter 122. The current sensor 220 may be between a low potential side of the DC power supply 230 and the inverter 122.

Figure 5:
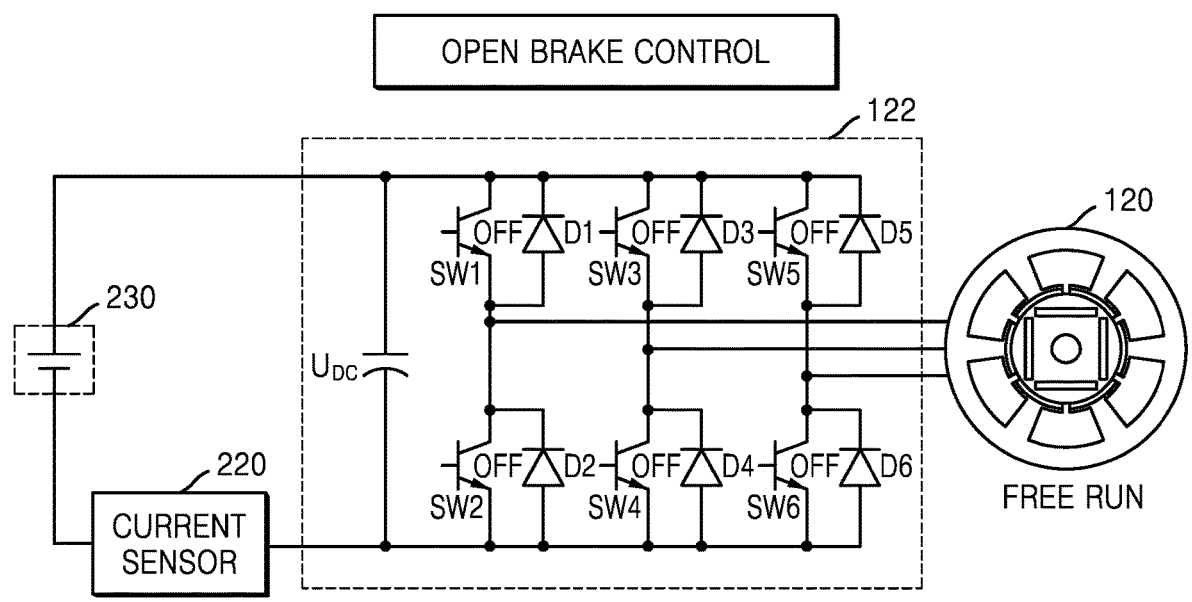
FIG. 5 is a diagram illustrating a process of performing open brake control, according to an embodiment of the disclosure.

FIG. 5 is a diagram illustrating a process of performing open brake control, according to an embodiment of the disclosure.

When the open brake control is performed, the switches SW1, SW2, SW3, SW4, SW5, and SW6 of the inverter 122 are all turned off. An open brake driving signal is generated to turn off all the switches of the inverter 122. When the switches SW1, SW2, SW3, SW4, SW5, and SW6 are all turned off, a driving current is not supplied to the motor 120, and the motor 120 enters a free-run state.

Figure 6:
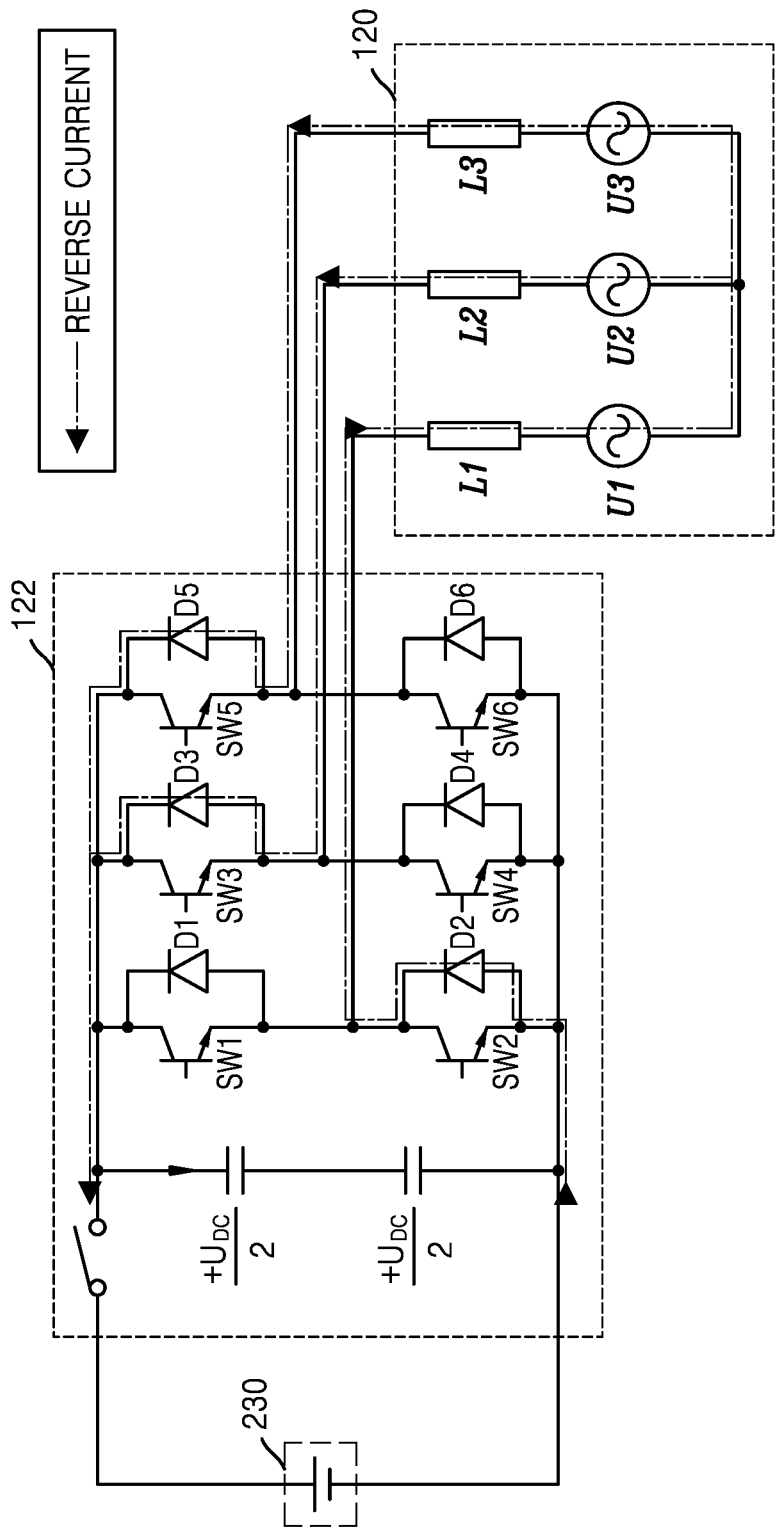
FIG. 6 is a diagram illustrating a case in which a reverse current is generated during open brake control, according to a comparative example.

FIG. 6 is a diagram illustrating a case in which a reverse current is generated during open brake control, according to a comparative example.

When the motor 120 is used to drive the compressor, the motor 120 may receive a pressure from the compressor. When the motor 120 is stopped using the open brake control, driving of the compressor is also stopped. When the driving of the compressor is stopped, the motor 120 may reversely rotate due to a pressure difference between the suction portion and the discharge portion. When the motor 120 reversely rotates, in response to an increase in a reverse rotation speed of the motor 120, a counter electromotive force voltage is generated in proportion to the motor speed. A reverse current may be generated by the counter electromotive force voltage. For example, as shown in FIG. 6, the reverse current may be generated.

When the motor 120 reversely rotates, the motor 120 serves as the generator and generates a counter electromotive force voltage. When a counter electromotive force is generated, the reverse current flows through the diodes D1, D2, D3, D4, D5, and D6 of the inverter 122. When the reverse current flows through the diodes D1, D2, D3, D4, D5, and D6 of the inverter 122, a voltage at both ends of the DC link capacitor $U_{DC}$ increases. Also, the DC link capacitor $U_{DC}$ is charged by the reverse current, and thus, a DC link voltage corresponding to the voltage at both ends of the DC link capacitor $U_{DC}$ increases. When the DC link voltage exceeds a rated voltage of the DC link capacitor $U_{DC}$, the DC link capacitor $U_{DC}$ may be damaged.

According to an embodiment of the disclosure, before reverse rotation of the motor 120 starts, the open brake control is switched to the short brake control, and thus, the reverse rotation of the motor 120 may be prevented. After forward rotation of the motor 120 stops in an open brake control state, the motor 120 starts to reversely rotate. According to an embodiment of the disclosure, the short brake control starts when the motor 120 reaches the reference speed value. Accordingly, the short brake control starts before the motor 120 stops. Therefore, the short brake control starts in a forward rotation state of the motor 120, and the reverse rotation of the motor 120 does not occur.

Figure 7:
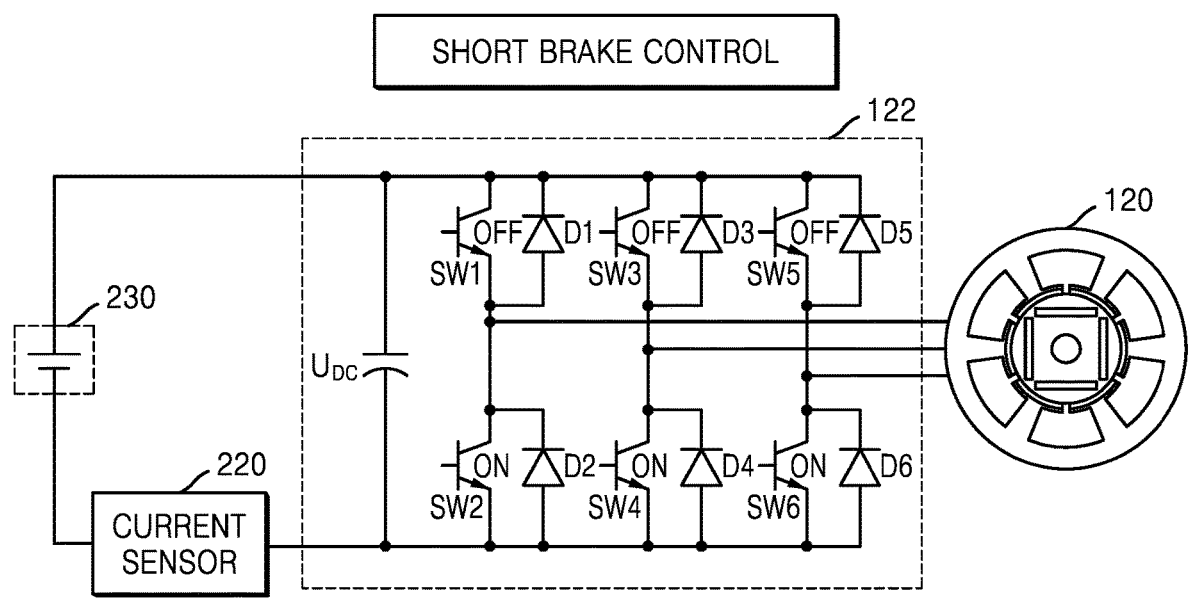
FIG. 7 is a diagram illustrating a process of performing short brake control, according to an embodiment of the disclosure.

FIG. 7 is a diagram illustrating a process of performing short brake control, according to an embodiment of the disclosure.

When the short brake control is performed, some of the switches SW1, SW2, SW3, SW4, SW5, and SW6 of the inverter 122 are turned on, while others are turned off. During the short brake control, some of the switches of the inverter 122 of the inverter 122 and the motor 120 form a closed loop. According to an embodiment of the disclosure, the second switch SW2, the fourth switch SW4, and sixth switch SW6 of the inverter 122 are turned on, and the first switch SW1, the third switch SW3, and the fifth switch SW5 are turned off. When the short brake control is performed, rotation of the motor 120 is stopped by applying a reverse torque to the motor 120.

Figure 8A:
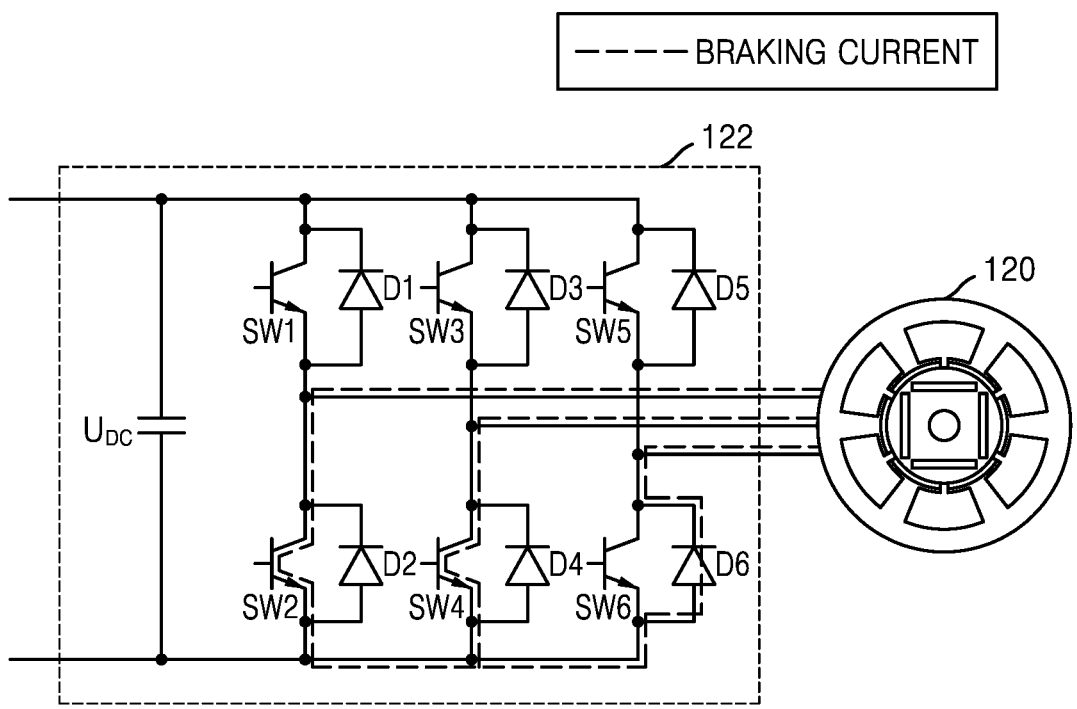
FIG. 8A is a diagram illustrating a case in which a braking current is generated, according to a comparative example of the disclosure.

FIG. 8A is a diagram illustrating a case in which a braking current is generated, according to a comparative example of the disclosure.

When the short brake control is performed in a state in which the motor speed has a certain magnitude or greater, a reverse current does not flow to the DC link capacitor $U_{DC}$, but a large braking current flows to the switches SW1, SW2, SW3, SW4, SW5, and SW6 or the diodes D1, D2, D3, D4, D5, and D6 of the inverter 122. When the braking current exceeds a rated level of the switches SW1, SW2, SW3, SW4, SW5, and SW6 or the diodes D1, D2, D3, D4, D5, and D6 of the inverter 122, the inverter 122 may be damaged. Also, when the short brake control is applied to the inverter 122 using the single DC link current sensor, there is no current sensor in the motor phase current path, and thus, a motor current may not be sensed.

A process of obtaining the motor current during the short brake control is as follows. The short brake control forcibly stops the rotation of the motor 120. A driving voltage of the motor 120 is determined by a motor resistance $r_s$, a motor current, a motor angular speed We, a motor inductance, and a counter electromotive force constant. Because the driving voltage becomes 0 during the short brake control, the driving voltage corresponding 0 may be expressed as Equations 1 and 2.

$$0 = r_s i_d^e - \omega_e L_q i_q^e \quad \text{[Equation 1]}$$

$$0 = r_s i_q^e + \omega_e L_d i_d^e + K_e \omega_e \quad \text{[Equation 2]}$$

In this regard, $i^e_d$ denotes a direct axis (d-axis) current, $i^e_q$ denotes a quadrature axis (q-axis) current, $L_d$ denotes a d-axis inductance, and $L_q$ denotes a q-axis inductance. From Equations 1 and 2, the d-axis current $I_d$ during the short brake control is defined as Equation 3, and the q-axis current $I_q$ during the short brake control is defined as Equation 4.

$$I_d = -\frac{L_q K_e \omega_e^2}{r_s^2 + L_d L_q \omega_e^2} \quad \text{[Equation 3]}$$

$$I_q = -\frac{r_s K_e \omega_e}{r_s^2 + L_d L_q \omega_e^2} \quad \text{[Equation 4]}$$

A braking current $I_s$, which is a motor current during the short brake control, is defined as in Equation 5.

$$I_s = \sqrt{i_d^{e^2} + i_q^{e^2}} \quad \text{[Equation 5]}$$

During the short brake control, the motor angular speed we is reduced due to a braking current in a reverse direction. A braking torque due to the braking current, which is generated in this case, is defined as in Equation 6.

$$T = -\frac{3P}{4} \cdot \frac{r_s K_e^2 \omega_e (r_s^2 + L_q^2 \omega_e^2)}{(r_s^2 + L_d L_q \omega_e^2)^2} \quad \text{[Equation 6]}$$

Figure 8B:
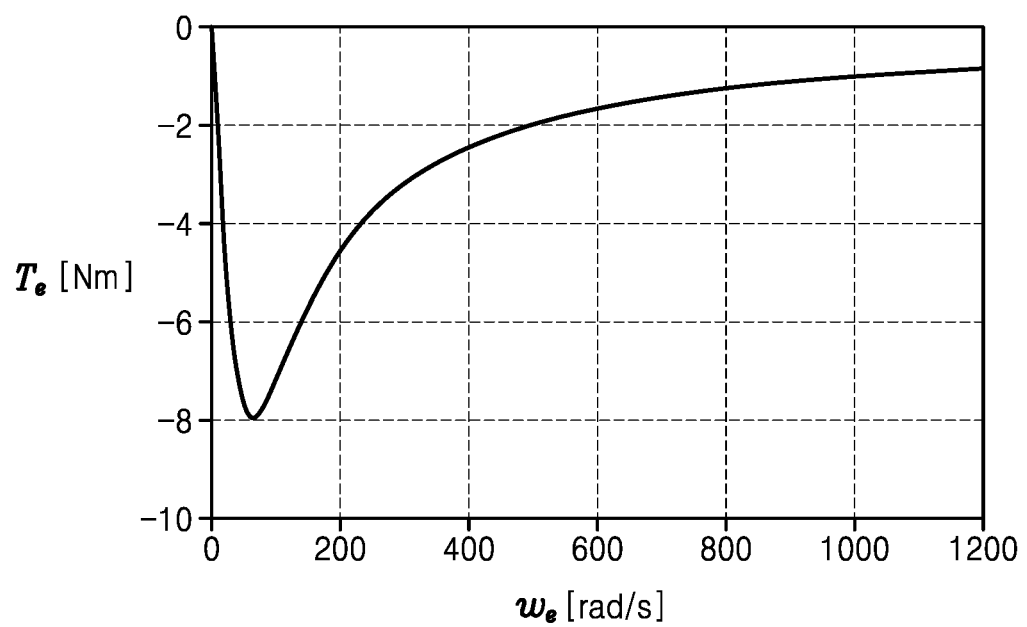
FIG. 8B is a diagram illustrating a braking torque according to a motor angular speed.

FIG. 8B is a diagram illustrating a braking torque according to a motor angular speed.

Referring to Equation 3 and 4, in a case in which the short brake control is performed when the motor angular speed $\omega_e$ is high, a magnitude of the braking current rapidly increases. Also, referring to Equation 6, in a case in which the short brake control is performed when the motor angular speed $\omega_e$ is high, a braking torque $T_e$ rather decreases. Referring to the graph of FIG. 8B, as the motor angular speed we increases, the magnitude of the braking torque $T_e$ increases at the low motor angular speed $\omega_e$, but the magnitude of the braking torque $T_e$ decreases when the motor angular speed $\omega_e$ increases to a certain value or more.

According to an embodiment of the disclosure, by starting the short brake control after the motor speed is reduced by open brake control, the short brake control may not only prevent generation of the braking current $I_s$ at a rated level of the inverter 122 or higher, but also perform the optimal brake function. Accordingly, the inverter 122 may be prevented from being broken down by the braking current $I_s$ during the short brake control.

Figure 9:
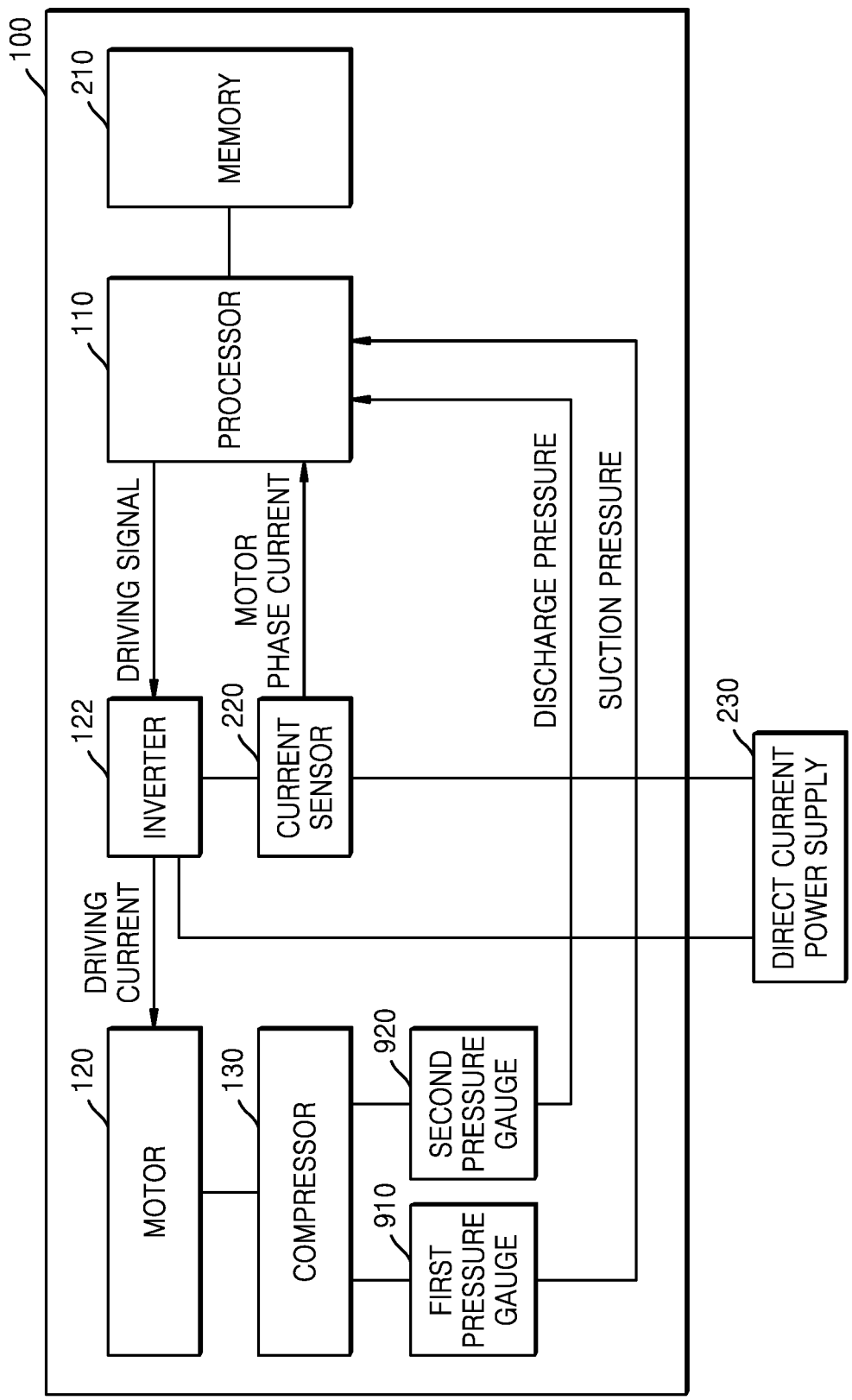
FIG. 9 is a diagram of a structure of a home appliance according to an embodiment of the disclosure.

FIG. 9 is a diagram of a structure of a home appliance according to an embodiment of the disclosure.

According to an embodiment of the disclosure, the home appliance 100 may include the processor 110, the motor 120, the compressor 130, the inverter 122, the memory 210, the current sensor 220, a first pressure gauge 910, and a second pressure gauge 920. In FIG. 9, differences from the home appliance 100 of FIG. 2 are mainly described.

The motor 120 may provide a driving force to the compressor 130. The compressor 130 may be used for temperature control and humidity control. The compressor 130 includes a suction portion for sucking in air, and a discharge portion for discharging high-pressure air. The first pressure gauge 910 measures a suction pressure by measuring air pressure of the suction portion. The first pressure gauge 910 outputs the measured suction pressure to the processor 110. The second pressure gauge 920 measures a discharge pressure by measuring air pressure of the discharge portion. The second pressure gauge 920 outputs the measured discharge pressure to the processor 110.

The processor 110 obtains a suction pressure value and a discharge pressure value. The processor 110 calculates a load torque of the motor 120 by using the suction pressure and the discharge pressure during open brake control. The processor 110 calculates reverse pressure obtained by subtracting the suction pressure from the discharge pressure, and calculates the load torque based on the reverse pressure.

Figure 10:
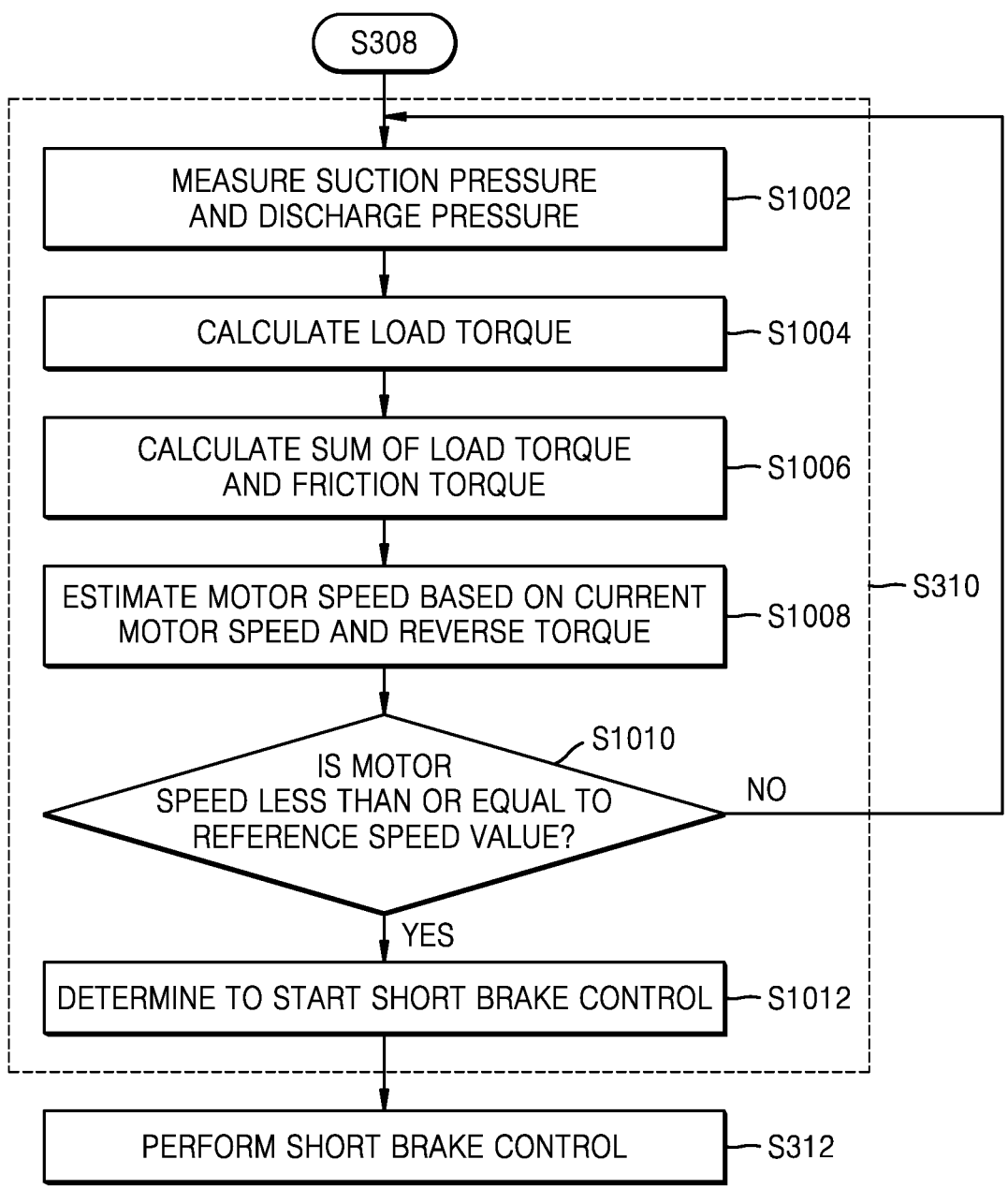
FIG. 10 is a flowchart illustrating a process of determining a start time point of short brake control and performing the short brake control, according to an embodiment of the disclosure.

FIG. 10 is a flowchart illustrating a process of determining a start time point of short brake control and performing the short brake control, according to an embodiment of the disclosure.

According to an embodiment of the disclosure, the home appliance 100 repeatedly estimates the motor speed, and starts the short brake control when the motor speed reaches the reference speed value.

First, in operation S1002, the home appliance 100 measures suction pressure and discharge pressure. The home appliance 100 measures the suction pressure by using the first pressure gauge 910 and measures the discharge pressure by using the second pressure gauge 920.

According to an embodiment of the disclosure, the home appliance 100 may measure the suction pressure and the discharge pressure after the open brake control is started. Also, the home appliance 100 may measure the suction pressure and the discharge pressure while the open brake control is performed.

In addition, according to an embodiment of the disclosure, the home appliance 100 may measure the suction pressure and the discharge pressure during a period in which the compressor 130 is driven and during a motor stop operation period. The home appliance 100 may monitor the state of the compressor 130 by measuring a suction pressure and a discharge pressure of the compressor 130.

Next, in operation S1004, the home appliance 100 calculates a load torque from the suction pressure and the discharge pressure. The load torque is determined based on a value obtained by subtracting the suction pressure from the discharge pressure.

Next, in operation S1006, the home appliance 100 calculates a sum of the load torque and a friction torque. The friction torque is a torque generated by a frictional force of the motor 120. The sum of the load torque and the friction torque corresponds to a reverse torque.

Next, in operation S1008, the home appliance 100 estimates the motor speed based on a current motor speed and the reverse torque. A motor speed $\omega$ is repeatedly estimated based on an estimated motor speed $\omega^*$. At the start of the open brake control, an initial motor speed corresponds to a previous loop motor speed $\omega_{e[n-1]}$. Thereafter, a current loop motor speed $\omega^*_{e[n]}$ estimated in a previous loop corresponds to the current motor speed, that is, the previous loop motor speed $\omega_{e[n-1]}$. Estimation of the motor speed is repeated until the motor speed reaches the reference speed value.

Next, in operation S1010, the home appliance 100 determines whether the motor speed is less than or equal to the reference speed value. The reference speed value is determined as a motor speed at which reverse rotation does not occur during the open brake control, and a braking current exceeding a rated current of the inverter 122 does not occur during the short brake control.

When the motor speed is not less than or equal to the reference speed value, the home appliance 100 returns to operation S1002 and re-estimates the motor speed.

When the motor speed is less than or equal to the reference speed value, the home appliance 100 determines to start the short brake control in operation S1012.

In response to determining a start time point for starting the short brake control, the home appliance 100 performs the short brake control in operation S312.

Figure 11:
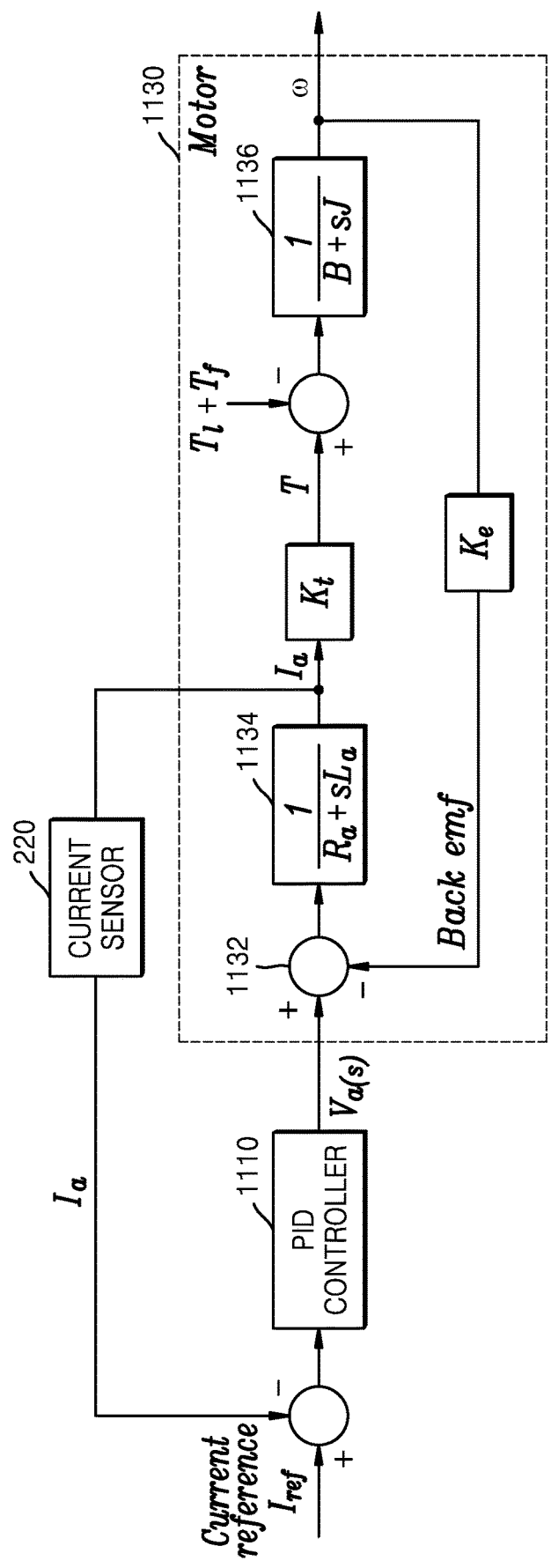
FIG. 11 is a control block diagram of driving a motor, according to an embodiment of the disclosure.

FIG. 11 is a control block diagram of driving a motor, according to an embodiment of the disclosure.

FIG. 11 is a model illustrating a control and motor operation of the motor 120. The motor operation is described based on the model of FIG. 11. The control operation of the motor 120 shown in FIG. 11 may be performed by the processor 110. A motor model 1130 is a model illustrating a motor speed $\omega$ based on an input voltage Va(s). The current sensor 220 measures a motor phase current Ia during the operation of the motor 120. A proportional integral derivation (PID) controller 1110 performs PWM control by receiving a difference value between the motor phase current Ia and a reference current Iref. The PID controller 1110 inputs Va(s) generated through PWM control to the motor model 1130.

The motor model 1130 has a counter electromotive force Back emf generated by rotation of the motor 120. The counter electromotive force Back emf may be calculated by multiplying a rotation speed $\omega$ of the motor 120 by a counter electromotive force constant Ke.

The driving voltage Va(s)) input from the PID controller 1110 and the counter electromotive force Back emf are input to an electrical model 1134 of the motor 120. The electrical model 1134 of the motor 120 represents a motor phase current Ia with respect to the input voltage. In the electrical model 1134 of the motor 120, Ra denotes a motor resistance, and La denotes a motor inductance. The motor phase current Ia is inversely proportional to a sum of integral values of the motor resistance Ra and the motor inductance La. The motor phase current Ia is detected by the current sensor 220 and fed back to an input end of the PID controller 1110 again.

The motor phase current Ia drives the motor 120. A driving torque T is generated based on the motor phase current Ia and a motor torque constant Kt. Also, a reverse torque $T_l+T_f$ of the motor 120 is generated by a sum of a load torque $T_l$ and a friction torque $T_f$. The motor speed ω may be calculated by inputting a difference between the driving torque T and the reverse torque $T_l+T_f$ to a motor mechanical model 1136. In the motor mechanical model 1136, B denotes a friction coefficient of and J denotes an inertial moment. The motor speed ω is inversely proportional to a sum of the friction coefficient B and an integral value of the inertial moment J.

When the open brake control is performed, a current output from the PID controller 1110 is 0. Accordingly, because the motor phase current Ia is 0 in the motor model 1130, the motor speed ω may be determined based on the reverse torque $T_l+T_f$ and the motor mechanical model 1136. The processor 110 estimates the motor speed ω by using the motor mechanical model 1136.

Figure 12:
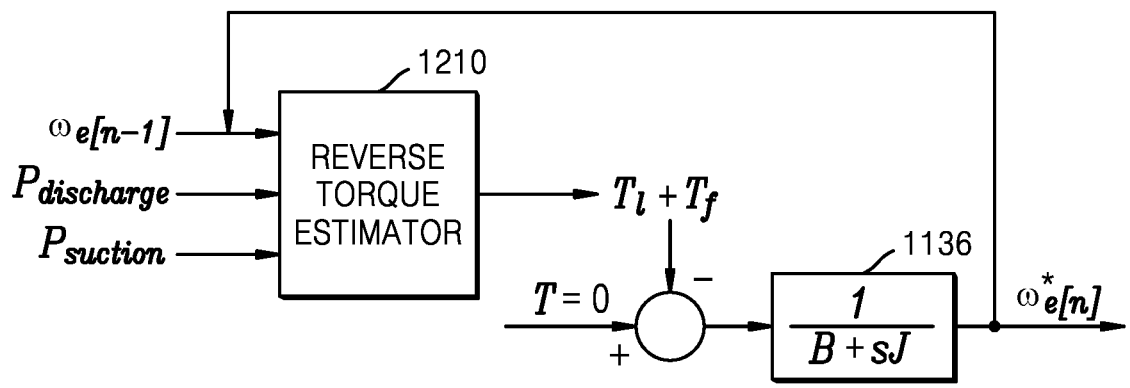
FIG. 12 is a diagram illustrating a process of estimating a motor speed during open brake control, according to an embodiment of the disclosure.

FIG. 12 is a diagram illustrating a process of estimating a motor speed during open brake control, according to an embodiment of the disclosure.

The process of estimating a motor speed shown in FIG. 12 corresponds to operations S1004, S1006, and S1008 of FIG. 10.

According to an embodiment of the disclosure, the motor phase current Ia is 0 during the open brake control. Accordingly, the motor speed ω is determined by the motor mechanical model 1136. In FIG. 12, $\omega_{e[n-1]}$ denotes a motor speed estimated in a previous loop, and $\omega^*_{e[n]}$ denotes a motor speed estimated in a current loop. The motor speed ω*e[n] estimated in the current loop is fed back to a reverse torque estimator 1210 again.

The processor 110 repeatedly estimates the motor speed ω during the open brake control. In a first estimation, an initial motor speed $\omega^*_{e[n]}$ is input as the previous loop motor speed ωe[n−1]. In a second subsequent estimation, the motor speed estimated in the previous loop is input as the previous loop motor speed ωe[n−1].

The processor 110 obtains a suction pressure $P_{suction}$ measured by the first pressure gauge 910 and discharge pressure $P_{discharge}$ measured by the second pressure gauge 920. The processor 110 inputs the previous loop motor speed $\omega_{e[n-1]}$, the discharge pressure $P_{discharge}$, and the suction pressure $P_{suction}$ to the reverse torque estimator 1210. The reverse torque estimator 1210 estimates the reverse torque $T_l+T_f$ by receiving the previous loop motor speed $\omega_{e[n-1]}$, the discharge pressure $P_{discharge}$, and the suction pressure $P_{suction}$. The load torque $T_l$ is determined based on a difference between the discharge pressure $P_{discharge}$ and the suction pressure $P_{suction}$. The friction torque $T_f$ is determined based on the previous loop motor speed $\omega_{e[n-1]}$. The reverse torque $T_l+T_f$ corresponds to a sum of the load torque $T_l$ and the friction torque $T_f$.

The driving torque T is 0 during the open brake control. Accordingly, the current loop motor speed $\omega^*_{e[n]}$ is determined by the reverse torque $T_l+T_f$. The processor 110 estimates the current loop motor speed $\omega^*_{e[n]}$ by using the reverse torque $T_l+T_f$ and the motor mechanical model 1136. Also, the processor 110 repeatedly estimates the motor speed by feeding the current loop motor speed $\omega^*_{e[n]}$ back to the reverse torque estimator 1210.

When the current loop motor speed $\omega^*_{e[n]}$ is calculated, the processor 110 determines whether the current loop motor speed $\omega^*_{e[n]}$ is less than or equal to the reference speed value. As described in operation S1010 of FIG. 10, when the current loop motor speed $\omega^*_{e[n]}$ is less than or equal to the reference speed value, the processor 110 determines to start the short brake control in operation S1012. When the current loop motor speed $\omega^*_{e[n]}$ is greater than the reference speed value, the processor 110 returns to operation S1002 and repeats estimation of the motor speed.

Figure 13:
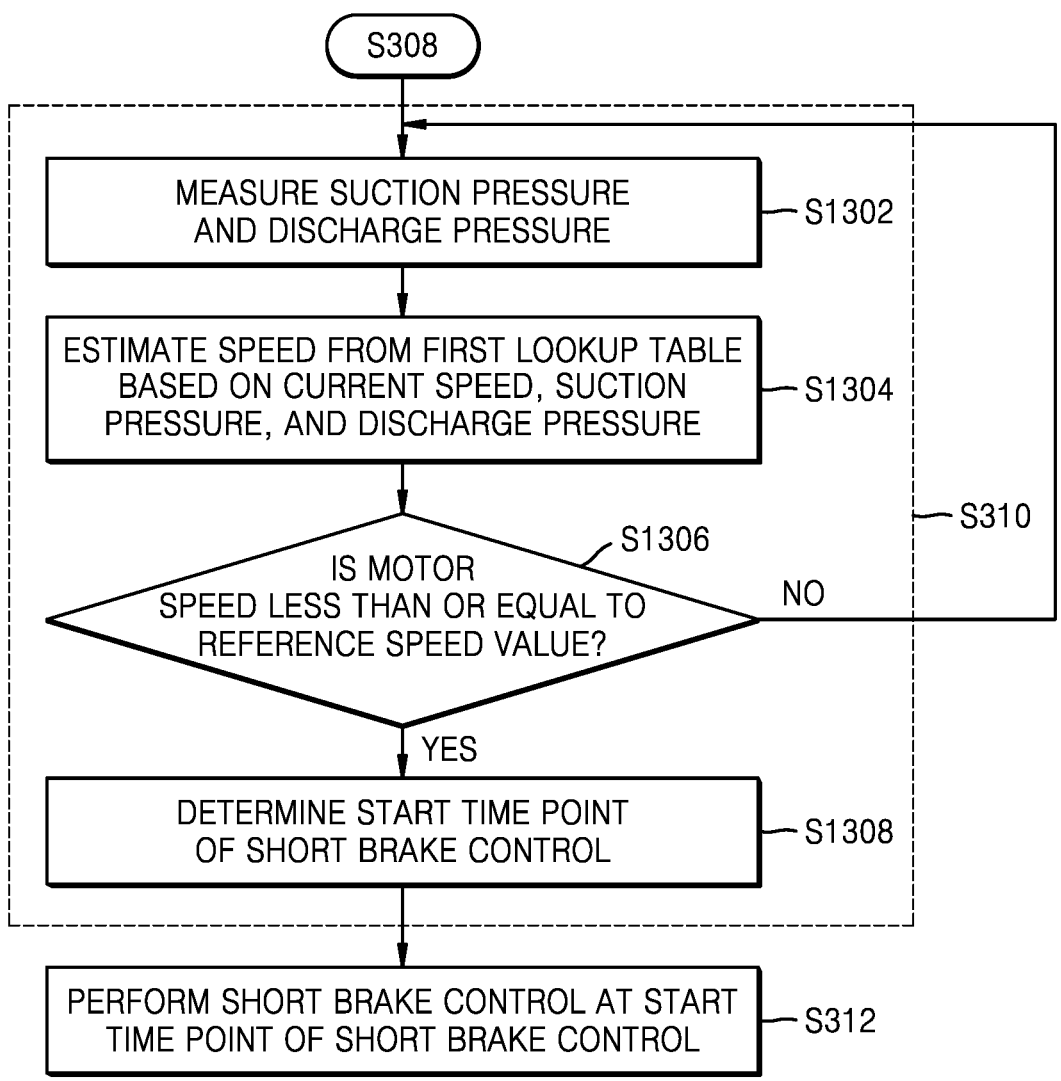
FIG. 13 is a flowchart illustrating a process of determining a start time point of short brake control and performing the short brake control, according to an embodiment of the disclosure.

FIG. 13 is a flowchart illustrating a process of determining a start time point of short brake control and performing the short brake control, according to an embodiment of the disclosure.

Figure 14:
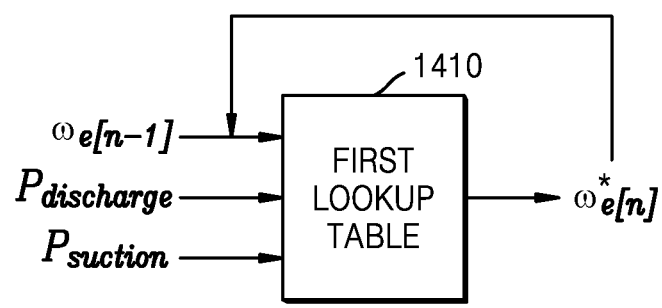
FIG. 14 is a diagram illustrating a process of estimating a motor speed, according to an embodiment of the disclosure.

FIG. 14 is a diagram illustrating a process of estimating a motor speed, according to an embodiment of the disclosure.

According to an embodiment of the disclosure, the home appliance 100 repeatedly estimates the motor speed, and starts the short brake control when the motor speed reaches the reference speed value. The home appliance 100 may repeatedly estimate the motor speed by using a first lookup table 1410.

First, in operation S1302, the home appliance 100 measures a suction pressure and a discharge pressure. The home appliance 100 measures the suction pressure by using the first pressure gauge 910 and measures the discharge pressure by using the second pressure gauge 920.

According to an embodiment of the disclosure, the home appliance 100 may measure the suction pressure and the discharge pressure after the open brake control is started. Also, the home appliance 100 may measure the suction pressure and the discharge pressure while the open brake control is performed.

In addition, according to an embodiment of the disclosure, the home appliance 100 may measure the suction pressure and the discharge pressure during a period in which the compressor 130 is driven and during a motor stop operation period. The home appliance 100 may monitor the state of the compressor 130 by measuring a suction pressure and a discharge pressure of the compressor 130.

Next, in operation S1304, the current loop motor speed $\omega^*_{e[n]}$ is estimated from the first lookup table 1410 based on the previous loop motor speed $\omega_{e[n-1]}$, the discharge pressure $P_{discharge}$, and the suction pressure $P_{suction}$.

Referring to FIG. 14, the home appliance 100 estimates the motor speed ω by using the first lookup table 1410. The first lookup table 1410 includes an estimated motor speed value based on the current motor speed, the suction pressure, and the discharge pressure. The first lookup table 1410 may be stored in advance in the memory 210 of the home appliance 100. The processor 110 may estimate the current loop motor speed $\omega^*_{e[n]}$ from the previous loop motor speed $\omega_{e[n-1]}$, the discharge pressure $P_{discharge}$, and the suction pressure $P_{suction}$ by using the first lookup table 1410 stored in the memory 210.

The motor speed ω is repeatedly estimated based on the estimated motor speed ω*. At the start of the open brake control, the initial motor speed corresponds to the previous loop motor speed $\omega_{e[n-1]}$. Thereafter, the current loop motor speed $\omega^*_{e[n]}$ estimated in the previous loop corresponds to the current motor speed, that is, the previous loop motor speed ωe[n−1]. Estimation of the motor speed is repeated until the motor speed reaches the reference speed value.

Next, in operation S1306, the home appliance 100 determines whether the motor speed is less than or equal to the reference speed value. The reference speed value is determined as a motor speed at which reverse rotation does not occur during the open brake control, and a braking current exceeding the rated current of the inverter 122 does not occur during the short brake control.

When the motor speed is not less than or equal to the reference speed value, the home appliance 100 returns to operation S1302 and re-estimates the motor speed.

When the motor speed is less than or equal to the reference speed value, the home appliance 100 determines to start the short brake control in operation S1308.

In response to determining a start time point for starting the short brake control, the home appliance 100 performs the short brake control in operation S312.

Figure 15:
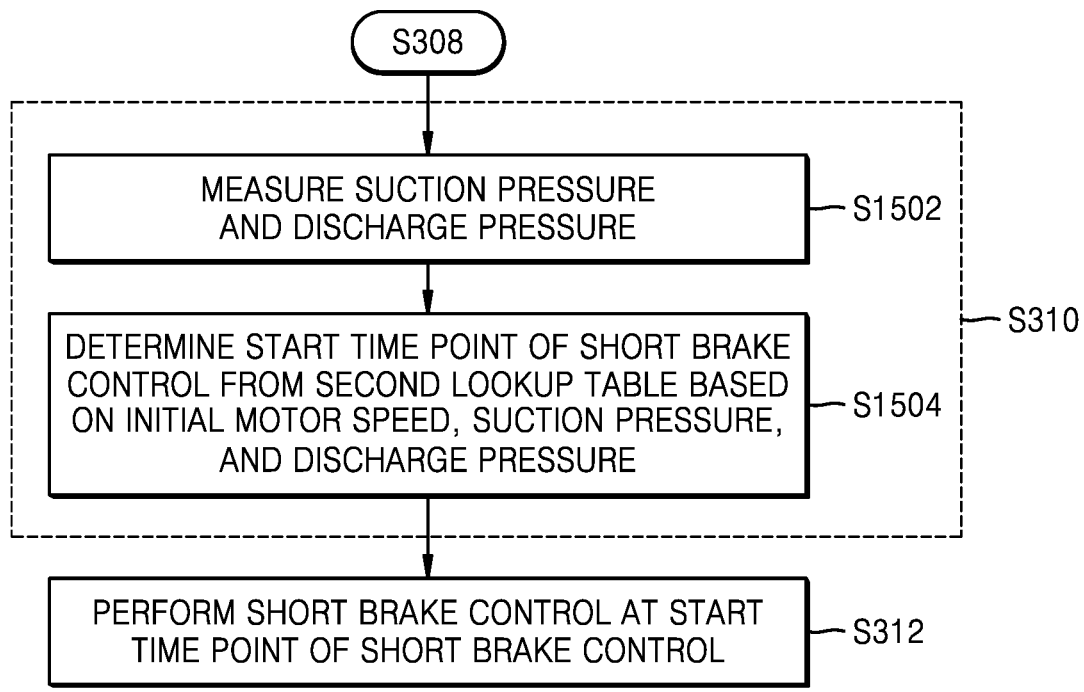
FIG. 15 is a flowchart illustrating a process of determining a start time point of short brake control and performing the short brake control, according to an embodiment of the disclosure.

FIG. 15 is a flowchart illustrating a process of determining a start time point of short brake control and performing the short brake control, according to an embodiment of the disclosure.

Figure 16:
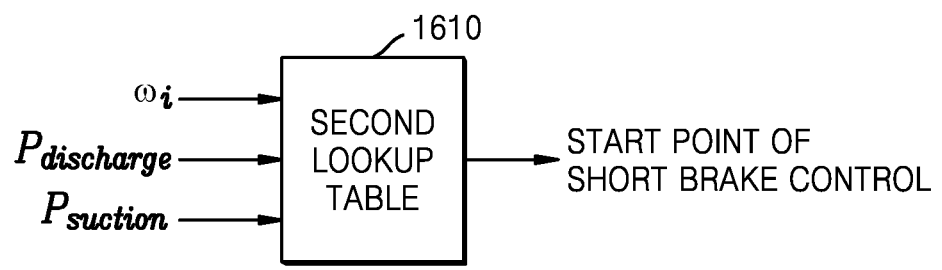
FIG. 16 is a diagram illustrating a process of estimating a start time point of short brake control, according to an embodiment of the disclosure.

FIG. 16 is a diagram illustrating a process of estimating a start time point of short brake control, according to an embodiment of the disclosure.

According to an embodiment of the disclosure, the home appliance 100 may determine the start time point of the short brake control based on an initial motor speed $\omega_i$, the discharge pressure $P_{discharge}$, and the suction pressure $P_{suction}$. The home appliance 100 may calculate the start time point of the short brake control from a second lookup table 1610 based on the initial motor speed $\omega_i$, the discharge pressure $P_{discharge}$, and the suction pressure $P_{suction}$.

First, in operation S1502, the home appliance 100 measures a suction pressure and a discharge pressure. The home appliance 100 measures the suction pressure by using the first pressure gauge 910 and measures the discharge pressure by using the second pressure gauge 920.

According to an embodiment of the disclosure, the home appliance 100 may measure the suction pressure and the discharge pressure after the open brake control is started. Also, the home appliance 100 may measure the suction pressure and the discharge pressure while the open brake control is performed.

In addition, according to an embodiment of the disclosure, the home appliance 100 may measure the suction pressure and the discharge pressure during a period in which the compressor 130 is driven and during a motor stop operation period. The home appliance 100 may monitor the state of the compressor 130 by measuring the suction pressure and the discharge pressure of the compressor 130.

Next, in operation S1504, a start time point of the short brake control is determined from the second lookup table 1610 based on the initial motor speed $\omega_i$, the discharge pressure $P_{discharge}$, and the suction pressure $P_{suction}$. The start time point of the short brake control may define a time from a current time point to a start time point of short brake control. For example, the start time point of the short brake control may be defined as after 34:05 seconds.

Referring to FIG. 16, the home appliance 100 estimates the start time point of the short brake control by using the second lookup table 1610. The second lookup table 1610 includes a start time point value of the short brake control based on the current motor speed, the suction pressure, and the discharge pressure. The second lookup table 1610 may be stored in advance in the memory 210 of the home appliance 100. The processor 110 may determine the start time point of the short brake control from the initial motor speed $\omega_i$, the discharge pressure $P_{discharge}$, and the suction pressure $P_{suction}$ by using the second lookup table 1610 stored in the memory 210.

Next, in operation S1506, the home appliance 100 performs the short brake control when the start time point of the short brake control is reached.

Figure 17:
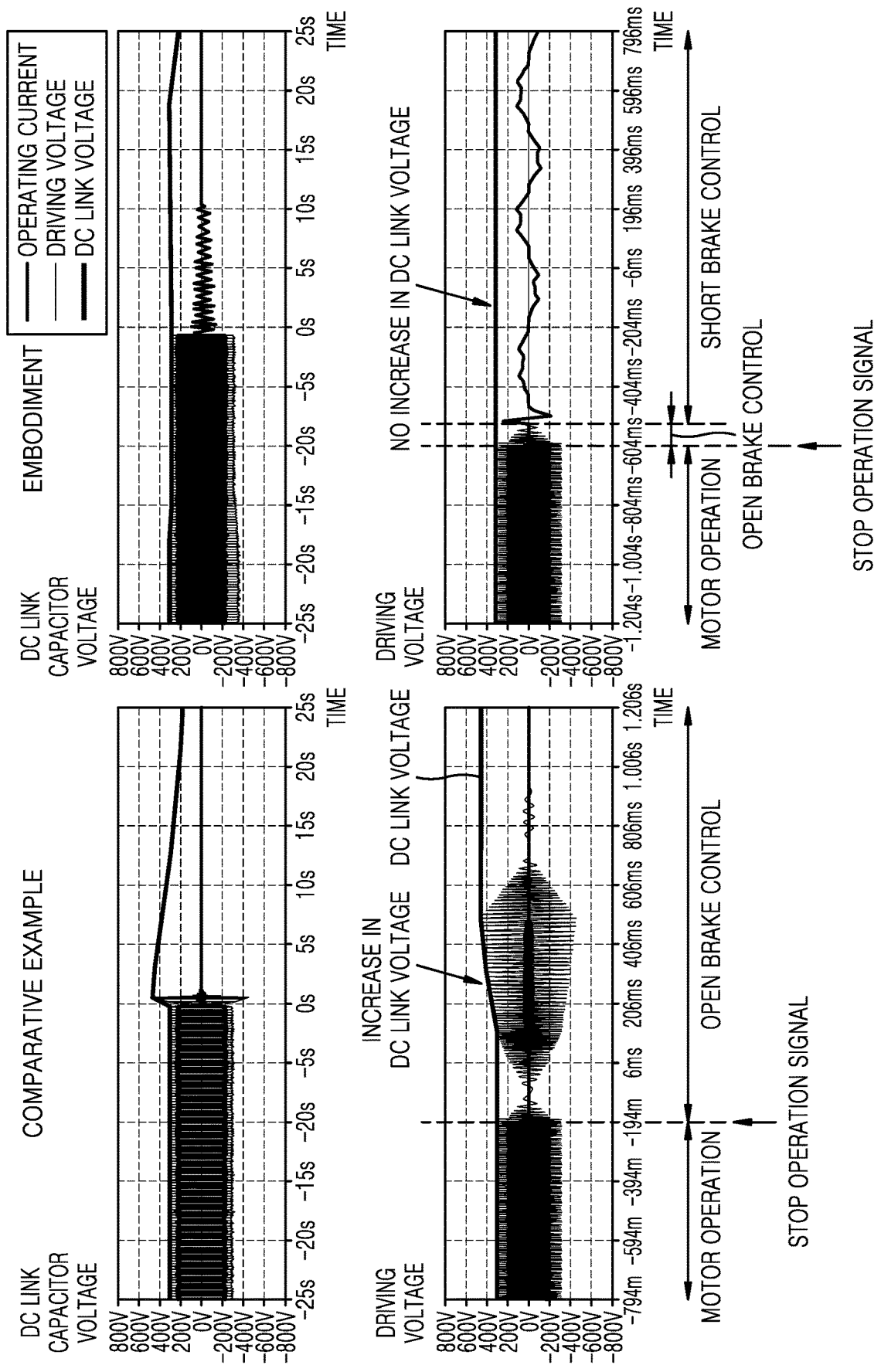
FIG. 17 is a diagram of a driving voltage and a direct current (DC) link capacitor voltage in a comparative example and an embodiment of the disclosure for performing open brake control.

FIG. 17 is a diagram of a driving voltage and a DC link capacitor voltage in a comparative example and an embodiment of the disclosure for performing open brake control.

The comparative example of FIG. 17 shows a case in which only the open brake control is applied. The embodiment of the disclosure shows a case in which the short brake control is performed at a dynamically determined start time point of the short brake control after the open brake control. In the comparative example, it may be seen that a DC link voltage increases during the open brake control. In contrast, according to an embodiment of the disclosure, it may be seen that the open brake control and the short brake control are performed without an increase in the DC link voltage. Also, according to an embodiment of the disclosure, it was identified that a braking current is at a level similar to that of an operating current.

Figure 18:
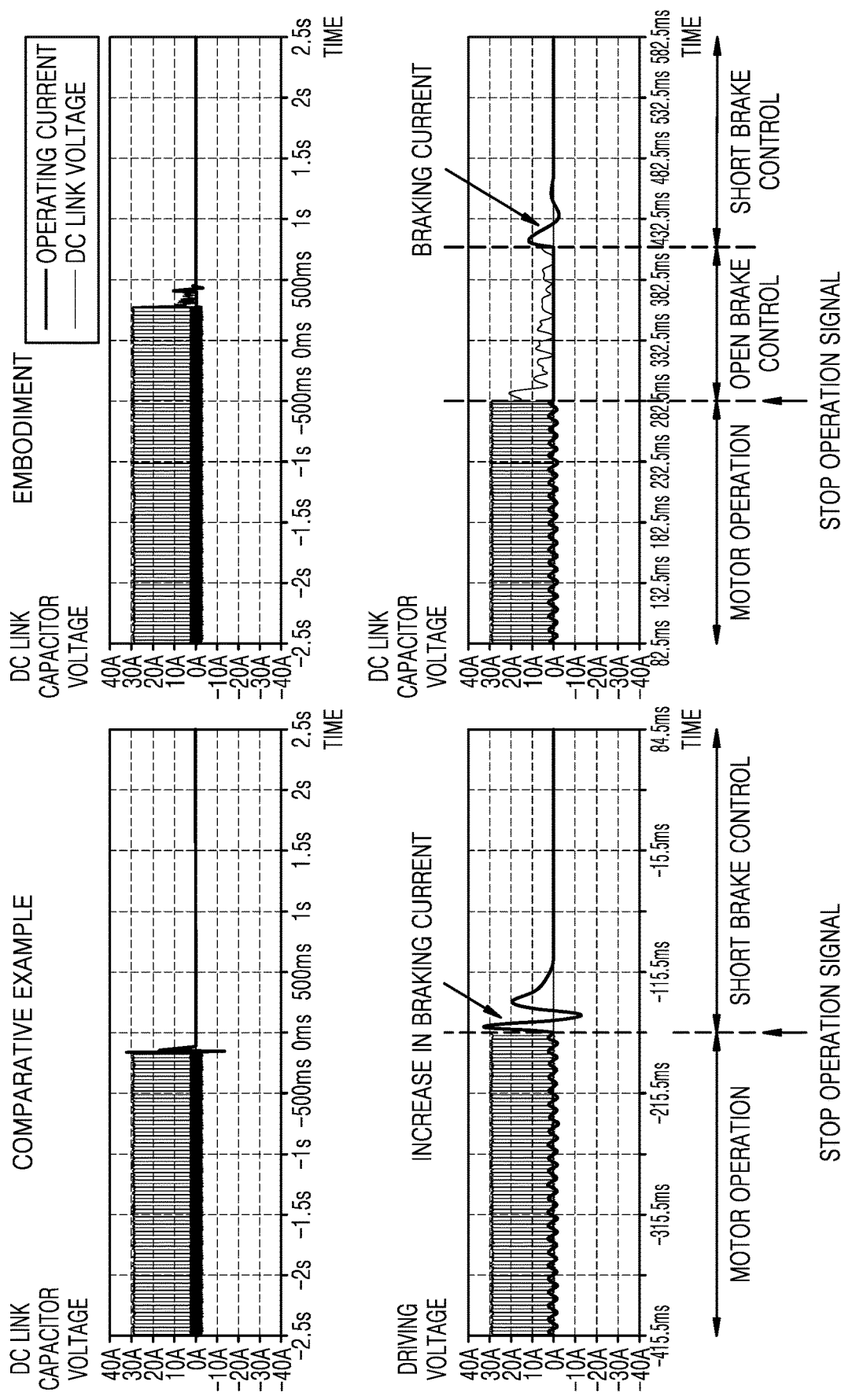
FIG. 18 is a diagram of a driving current and a DC link capacitor voltage in a comparative example and an embodiment of the disclosure for performing short brake control.

FIG. 18 is a diagram of a driving current and a DC link capacitor voltage in a comparative example and an embodiment of the disclosure for performing short brake control.

The comparative example of FIG. 18 shows a case in which only the short brake control is applied. The embodiment of the disclosure shows a case in which the short brake control is performed at a dynamically determined start time point of the short brake control after the open brake control.

According to the comparative example, it may be seen that a braking current rapidly increases after the short brake control is started. In the comparative example, a magnitude of the braking current greatly exceeds a magnitude of a general driving current.

In contrast, according to an embodiment of the disclosure, it was identified that the braking current was reduced by 50% or more compared to the comparative example.

According to the embodiments of the disclosure, by dynamically adjusting the open brake control time, the short brake control is started from the same motor speed even under various conditions with different motor speeds and different pressure differences between the discharge pressure and the suction pressure. Accordingly, according to the embodiments of the disclosure, the braking current may be significantly reduced, and an increase in the DC link voltage may be prevented. Also, by adjusting the start time point of the short brake control, noise may be reduced during a stop operation of the motor 120.

Figure 19:
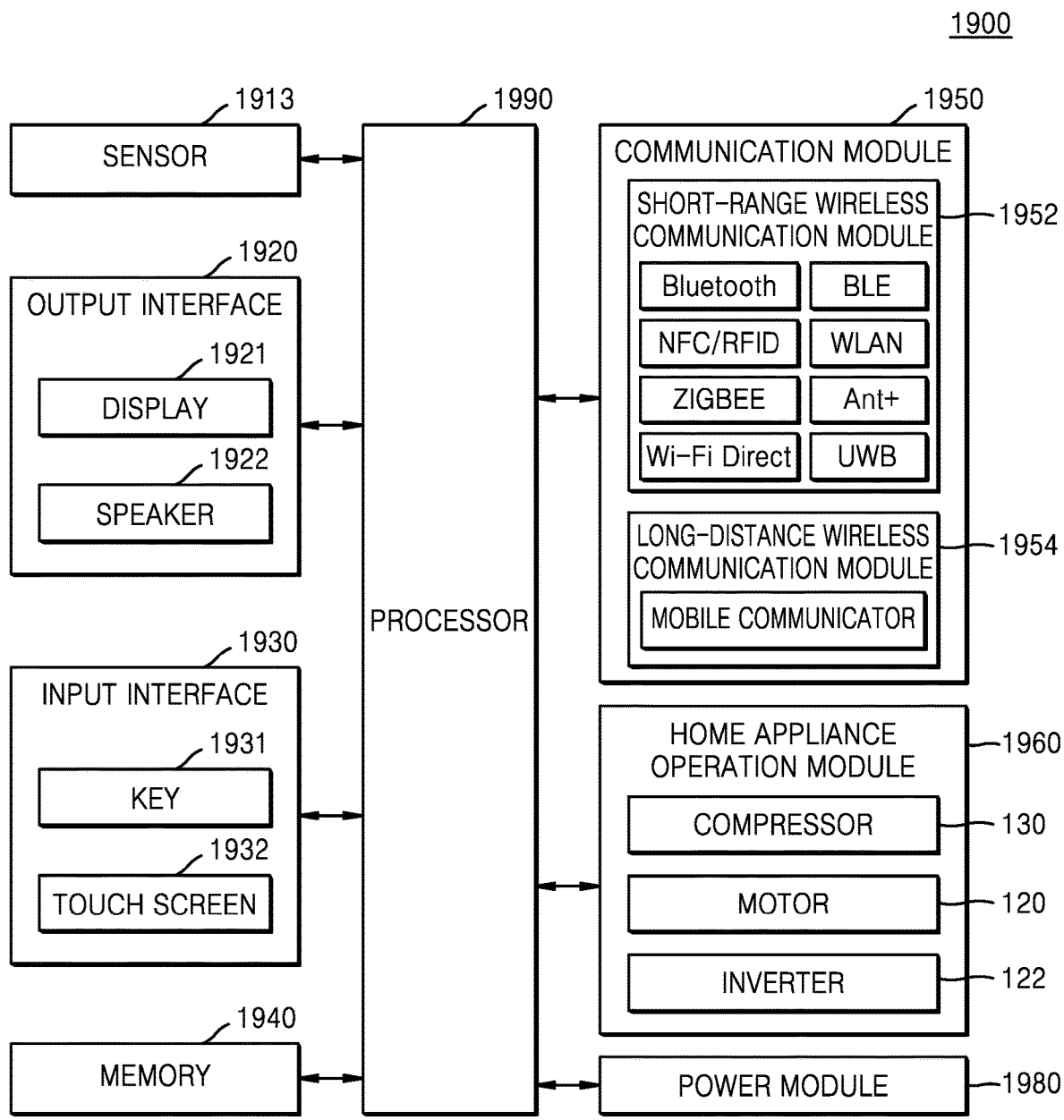
FIG. 19 is a block diagram of a structure of a home appliance according to an embodiment of the disclosure.

FIG. 19 is a block diagram of a structure of a home appliance according to an embodiment of the disclosure.

According to an embodiment of the disclosure, the home appliance 100 may correspond to the home appliance 1900. According to an embodiment of the disclosure, the home appliance 1900 includes a sensor 1910, an output interface 1920, an input interface 1930, a memory 1940, a communication module 1950, a home appliance operation module 1960, a power module 1980, and a processor 1990. The home appliance 1900 may include various combinations of the components shown in FIG. 19, and not all of the components shown in FIG. 19 are essential components.

The home appliance 1900 of FIG. 19 corresponds to the home appliance 100 described with reference to FIG. 2, the memory 1940 corresponds to the memory 210 described with reference to FIG. 2, and the processor 1990 corresponds to the processor 110 described with reference to FIG. 2.

The sensor 1910 may include various types of sensors. For example, the sensor 1910 may include various types of sensors, such as a pressure gauge, a current sensor, an image sensor, an infrared sensor, an ultrasonic sensor, a lidar sensor, a human detection sensor, a motion detection sensor, a proximity sensor, and an illuminance sensor. A function of each sensor may be intuitively inferred by one of ordinary skill in the art based on a name of the sensor, and thus, a detailed description thereof is omitted.

The output interface 1920 may include a display 1921 and a speaker 1922. The output interface 1920 may output various notifications, message, and information generated by the processor 1990.

The input interface 1930 may include a key 1931 and a touch screen 1932. The input interface 1930 receives a user input and transmits the same to the processor 1990.

The memory 1940 stores various pieces of information, data, instructions, and programs necessary for the operation of the home appliance 1900. The memory 1940 may include at least one or a combination of a volatile memory or a nonvolatile memory. The memory 1940 may include at least one type of storage medium among a flash memory type memory, a hard disk type memory, a multimedia card micro type memory, a card type memory (e.g., an SD or XD memory), random access memory (RAM), static RAM (SRAM), read-only memory (ROM), electrically erasable programmable ROM (EEPROM), PROM, a magnetic memory, a magnetic disk, and an optical disk. Also, the home appliance 1900 may operate a web storage or a cloud server that performs a storage function on the Internet.

The communication module 1950 may include at least one or a combination of a short-range wireless communication module 1952 or a long-distance wireless communication module 1954. The communication module 1950 may include at least one antenna for wirelessly communicating with another apparatus.

The short-rage wireless communication module 1952 may include a Bluetooth communication module, a Bluetooth low energy (BLE) communication module, a near-field communication module, a wireless local area network (WLAN) (Wi-Fi) communication module, a Zigbee communication module, an infrared data association (IrDA) communication module, a Wi-Fi direct (WFD) communication module, an ultra-wideband (UWB) communication module, an Ant+ communication module, a micro-wave (uWave) communication module, or the like, but is not limited thereto.

The long-distance wireless communication module 1954 may include communication modules that perform various types of long-distance communication, and may include a mobile communicator. The mobile communicator transmits or receives a wireless signal to or from at least one of a base station, an external terminal, and a server on a mobile communication network. In this case, the wireless signal may include a sound call signal, a video call signal, or various types of data according to transmission or reception of a text/multimedia message.

The home appliance operation module 1960 includes an operation module that performs an intrinsic function of the home appliance 1900. The home appliance operation module 1960 may include the compressor 130, the motor 120, and the inverter 122.

The power module 1980 is connected to a power supply and supplies power to the home appliance 1900.

The processor 1990 controls the overall operation of the home appliance 1900. The processor 1990 may control the components of the home appliance 1900 by executing a program stored in the memory 1940.

According to an embodiment of the disclosure, the processor 1990 may include a separate NPU that performs an operation of an artificial intelligence model. Also, the processor 1990 may include a CPU, a GPU, or the like.

A machine-readable storage medium may be provided in the form of a non-transitory storage medium. In this regard, the "non-transitory storage medium" simply means that the storage medium is a tangible device and does not include a signal (e.g., an electromagnetic wave), but this term does not differentiate between where data is semi-permanently stored in the storage medium and where the data is temporarily stored in the storage medium. For example, the "non-transitory storage medium" may include a buffer in which data is temporarily stored.

According to an embodiment of the disclosure, the method according to various embodiments provided in the present document may be provided by being included in a computer program product. The computer program product may be traded as a product between a seller and a buyer. The computer program product may be distributed in the form of a machine-readable storage medium (e.g., a compact disc read-only memory (CD-ROM)), or distributed (e.g., downloaded or uploaded) through an application store, or directly or online between two user apparatuses (e.g., smart phones). In the case of online distribution, at least a portion of a computer program product (e.g., a downloadable application) may be temporarily stored in a machine-readable storage medium, such as a memory of a manufacturer's server, an application store's server, or a relay server, or may be temporarily generated.

According to an embodiment of the disclosure, provided is a control method for a home appliance 100 including a motor 120, the control method including measuring a motor phase current of the motor 120, receiving a stop signal that stops the motor 120, based on the stop signal, performing open brake control that stops supply of a current to the motor 120, based on the motor phase current at a start of the open brake control, estimating an initial motor speed at the start of the open brake control, based on the initial motor speed, determining a start time point of short brake control that applies a torque in a reverse direction to a rotation direction of the motor 120, and performing the short brake control at the determined start time point of the short brake control.

Also, according to an embodiment of the disclosure, the motor 120 may correspond to a brushless three-phase permanent magnet synchronous motor.

Also, according to an embodiment of the disclosure, the motor 120 may be configured to receive an alternating current driving current from an inverter 122, and the measuring of the motor phase current of the motor 120 may include measuring a current that is input from the inverter 122 to a direct current power supply.

Also, according to an embodiment of the disclosure, the motor 120 may be configured to drive the compressor 130, and the determining of the start time point of the short brake control may include repeatedly estimating a motor speed that decreases from the initial motor speed, and determining the start time point of the short brake control, such that the short brake control is started after a time point when the estimated motor speed decreases to a reference speed value or less.

Also, according to an embodiment of the disclosure, the control method for the home appliance 100 may further include measuring a suction pressure value of the compressor 130, and measuring a discharge pressure value of the compressor 130, wherein the repeatedly estimating of the motor speed may include repeatedly estimating the motor speed based on the estimated motor speed, the measured suction pressure value, and the measured discharge pressure value.

Also, according to an embodiment of the disclosure, the repeatedly estimating of the motor speed may further include calculating a load torque of the motor 120 based on a difference between the suction pressure value and the discharge pressure value, and repeatedly estimating the motor speed based on a sum of the load torque of the motor 120 and a friction torque of the motor 120, the estimated motor speed, a friction coefficient of the motor 120, and an integral value of an inertial moment of the motor 120.

Also, according to an embodiment of the disclosure, the motor 120 may be a motor configured to drive the compressor 130, the control method for the home appliance 100 may further include measuring the suction pressure value of the compressor 130, and measuring the discharge pressure value of the compressor 130, and the determining of the start time point of the short brake control may further include, based on a first lookup table including an estimated motor speed value according to a current motor speed, a suction pressure, and a discharge pressure, repeatedly estimating the motor speed from the estimated motor speed value, the measured suction pressure value, and the measured discharge pressure value, and determining the start time point of the short brake control, such that the short brake control is started after the time point when the estimated motor speed decreases to the reference speed value or less.

Also, according to an embodiment of the disclosure, the motor 120 may be a motor configured to drive the compressor 130, the control method for the home appliance 100 may further include measuring the suction pressure value of the compressor 130, and measuring the discharge pressure value of the compressor 130, and the determining of the start time point of the short brake control may include, based on a second lookup table including a short brake switching time value according to a current motor speed, a suction pressure, and a discharge pressure, determining the start time point of the short brake control from the initial motor speed, the measured suction pressure value, and the measured discharge pressure value.

Also, according to an embodiment of the disclosure, the performing of the open brake control may include stopping the supply of the current to the motor 120 by turning off a switch of the inverter 122 configured to drive the motor 120.

Also, according to an embodiment of the disclosure, the performing of the short brake control may include generating a closed loop between the motor 120 and a circuit of the inverter 122, by turning on some of switches of the inverter 122 configured to drive the motor 120.

In addition, according to an embodiment of the disclosure, provided is a home appliance 100 including a motor 120, an inverter 122 configured to output an alternating current driving current to the motor 120 by generating an alternating current from a direct current power supply, a current sensor 210 configured to measure a motor phase current of the motor 120, a memory 210 storing at least one instruction, and at least one processor 110 configured to execute the at least one instruction to receive a stop signal that stops the motor 120, based on the stop signal, perform open brake control that stops supply of a current to the motor 120, based on the motor phase current at a start of the open brake control, estimate an initial motor speed at the start of the open brake control, based on the initial motor speed, determine a start time point of short brake control that applies a torque in a reverse direction to a rotation direction of the motor 120, and perform the short brake control at the determined start time point of the short brake control.

Also, according to an embodiment of the disclosure, the motor 120 may correspond to a brushless three-phase permanent magnet synchronous motor.

Also, according to an embodiment of the disclosure, the current sensor 210 may be configured to measure a current that is input from the inverter 122 to the direct current power supply.

Also, according to an embodiment of the disclosure, the home appliance 100 may further include a compressor 130 driven by the motor 120, wherein the at least one processor 110 may be further configured to execute the at least one instruction to repeatedly estimate motor speed that decreases from the initial motor speed, and determine the start time point of the short brake control, such that the short brake control is started after a time point when the estimated motor speed decreases to a reference speed value or less.

Also, according to an embodiment of the disclosure, the home appliance 100 may further include a first pressure gauge 910 configured to measure a suction pressure of the compressor 130, and a second pressure gauge 920 configured to measure a discharge pressure of the compressor 130, wherein the at least one processor 110 may be further configured to execute the at least one instruction to repeatedly estimate the motor speed based on the estimated motor speed, the measured suction pressure value, and the measured discharge pressure value.

Also, according to an embodiment of the disclosure, the at least one processor 110 may be further configured to execute the at least one instruction to calculate a load torque of the motor 120 based on a difference between the suction pressure value and the discharge pressure value, and repeatedly estimate the motor speed based on a sum of the load torque of the motor 120 and a friction torque of the motor 120, the estimated motor speed, a friction coefficient of the motor 120, and an integral value of an inertial moment of the motor 120.

Also, according to an embodiment of the disclosure, the home appliance 100 may further include the compressor 130 driven by the motor 120, the first pressure gauge 910 configured to measure the suction pressure of the compressor 130, and the second pressure gauge 920 configured to measure the discharge pressure of the compressor 130, wherein the at least one processor 110 may be further configured to execute the at least one instruction to, based on a first lookup table including an estimated motor speed value according to a current motor speed, a suction pressure, and a discharge pressure, repeatedly estimate the motor speed from the estimated motor speed value, the measured suction pressure value, and the measured discharge pressure value, and determine the start time point of the short brake control, such that the short brake control is started after the time point when the estimated motor speed decreases to the reference speed value or less.

Also, according to an embodiment of the disclosure, the home appliance 100 may further include the compressor 130 driven by the motor 120, the first pressure gauge 910 configured to measure the suction pressure of the compressor 130, and the second pressure gauge 920 configured to measure the discharge pressure of the compressor 130, wherein the at least one processor 110 may be further configured to execute the at least one instruction to, based on a second lookup table including a short brake switching time value according to a current motor speed, a suction pressure, and a discharge pressure, determining the start time point of the short brake control from the initial motor speed, the measured suction pressure value, and the measured discharge pressure value.

Also, according to an embodiment of the disclosure, the at least one processor 110 may be further configured to execute the at least one instruction to perform the open brake control, by turning off a switch of the inverter 122 configured to drive the motor 120 and stopping the supply of the current to the motor 120.

Also, according to an embodiment of the disclosure, the at least one processor 110 may be further configured to execute the at least one instruction to perform the short brake control, by turning on some of switches of the inverter 122 configured to drive the motor 120 and generating a closed loop between the motor 120 and a circuit of the inverter 122.

According to an embodiment of the disclosure, provided is a computer-readable recording medium having recorded thereon a program to perform the control method for the home appliance on a computer.

The invention claimed is:

1. A control method for a home appliance including a motor that is driven by a driving current, the control method comprising:
receiving a stop signal to stop the motor;
based on receiving the stop signal, performing open brake control that stops supply of the driving current to the motor;
based on a motor phase current of the motor at a start of the open brake control, estimating an initial motor speed of the motor at the start of the open brake control;
based on the estimated initial motor speed, determining a start time point of short brake control that applies a torque in a reverse direction to a rotation direction of the motor; and
performing the short brake control at the determined start time point of the short brake control.

2. The control method of claim 1, wherein the motor is a brushless three-phase permanent magnet synchronous motor.

3. The control method of claim 1, wherein
the driving current is an alternating current driving current,
the motor receives the driving current from an inverter to which a current is input from a direct current power supply, and
the method further comprises measuring the motor phase current of the motor at the start of the open brake control by measuring the current that is input to the inverter from the direct current power supply.

4. The control method of claim 1, wherein
the motor is configured to drive a compressor, and
the determining of the start time point of the short brake control includes:
repeatedly estimating a motor speed of the motor that decreases from the initial motor speed, and
determining the start time point of the short brake control so that the short brake control is started after a time point when the estimated motor speed decreases to a reference speed value or less.

5. The control method of claim 4, further comprising:
measuring a suction pressure value of the compressor; and
measuring a discharge pressure value of the compressor,
wherein the repeatedly estimating of the motor speed incudes repeatedly estimating the motor speed based on the estimated motor speed, the measured suction pressure value, and the measured discharge pressure value.

6. The control method of claim 5, wherein the repeatedly estimating of the motor speed further includes:
calculating a load torque of the motor based on a difference between the measured suction pressure value and the measured discharge pressure value, and
repeatedly estimating the motor speed based on a sum of the calculated load torque of the motor and a friction torque of the motor, the estimated motor speed, a friction coefficient of the motor, and an integral value of an inertial moment of the motor.

7. The control method of claim 5, wherein the determining of the start time point of the short brake control includes:
based on a lookup table including an estimated motor speed value according to a current motor speed, a suction pressure, and a discharge pressure, repeatedly estimating the motor speed from the estimated motor speed value, the measured suction pressure value, and the measured discharge pressure value, and
determining the start time point of the short brake control so that the short brake control is started after the time point when the estimated motor speed decreases to the reference speed value or less.

8. The control method of claim 1, wherein
the motor is configured to drive a compressor, and
the control method further comprises:
measuring a suction pressure value of the compressor, and
measuring a discharge pressure value of the compressor, and
the determining of the start time point of the short brake control includes, based on a lookup table including a short brake switching time value according to a current motor speed, a suction pressure, and a discharge pressure, determining the start time point of the short brake control from the initial motor speed, the measured suction pressure value, and the measured discharge pressure value.

9. The control method of claim 1, wherein the performing of the open brake control includes:
stopping supply of the driving current to the motor by turning off a switch of an inverter configured to drive the motor.

10. The control method of claim 1, wherein the performing of the short brake control includes:
generating a closed loop between the motor and a circuit of an inverter configured to drive the motor, by turning on some switches of the inverter.

11. A computer-readable recording medium having recorded thereon a program that is executable by a computer to perform the control method of claim 1.

12. A home appliance comprising:
a motor;
an inverter configured to output an alternating current driving current to the motor by generating an alternating current from a direct current power supply;
a current sensor configured to measure a motor phase current of the motor;
a memory storing at least one instruction; and
at least one processor configured to execute the at least one instruction to:
receive a stop signal to stop the motor,
based on receiving the stop signal, perform open brake control that stops supply of the driving current to the motor,
based on the motor phase current measured by the current sensor at a start of the open brake control, estimate an initial motor speed of the motor at the start of the open brake control, based on the estimated initial motor speed, determine a start time point of short brake control that applies a torque in a reverse direction to a rotation direction of the motor, and perform the short brake control at the determined start time point of the short brake control.

13. The home appliance of claim 12, wherein the motor is a brushless three-phase permanent magnet synchronous motor.

14. The home appliance of claim 12, wherein the current sensor is configured to measure a current that is input to the inverter from the direct current power supply, to measure the motor phase current.

15. The home appliance of claim 12, further comprising:
a compressor that is driven by the motor,
wherein the at least one processor is further configured to execute the at least one instruction to:
repeatedly estimate a motor speed of the motor that decreases from the initial motor speed, and
determine the start time point of the short brake control so that the short brake control is started after a time point when the estimated motor speed decreases to a reference speed value or less.

16. The home appliance of claim 15, further comprising:
a first pressure gauge configured to measure a suction pressure value of the compressor; and
a second pressure gauge configured to measure a discharge pressure value of the compressor,
wherein the at least one processor is further configured to execute the at least one instruction to repeatedly estimate the motor speed based on the estimated motor speed, the measured suction pressure value, and the measured discharge pressure value.

17. The home appliance of claim 16, wherein the at least one processor is further configured to execute the at least one instruction to:
calculate a load torque of the motor based on a difference between the measured suction pressure value and the measured discharge pressure value, and
repeatedly estimate the motor speed based on a sum of the calculated load torque of the motor and a friction torque of the motor, the estimated motor speed, a friction coefficient of the motor, and an integral value of an inertial moment of the motor.

18. The home appliance of claim 12, further comprising:
a compressor that is driven by the motor;
a first pressure gauge configured to measure a suction pressure value of the compressor, and
a second pressure gauge configured to measure a discharge pressure value of the compressor,
wherein the at least one processor is further configured to execute the at least one instruction to:
based on a lookup table including an estimated motor speed value according to a current motor speed, a suction pressure, and a discharge pressure, repeatedly estimate the motor speed from the estimated motor speed value, the measured suction pressure value, and the measured discharge pressure value, and
determine the start time point of the short brake control so that the short brake control is started after the time point when the estimated motor speed decreases to a reference speed value or less.

19. The home appliance of claim 12, further comprising:
a compressor that is driven by the motor;
a first pressure gauge configured to measure a suction pressure value of the compressor; and
a second pressure gauge configured to measure a discharge pressure value of the compressor,
wherein the at least one processor is further configured to execute the at least one instruction to, based on a lookup table including a short brake switching time value according to a current motor speed, a suction pressure, and a discharge pressure, determine the start time point of the short brake control from the initial motor speed, the measured suction pressure value, and the measured discharge pressure value.

20. The home appliance of claim 12, wherein the at least one processor is further configured to execute the at least one instruction to:
perform the open brake control by turning off a switch of the inverter to stop supply of the driving current to the motor, and
perform the short brake control by turning on some of switches of the inverter and generating a closed loop between the motor and a circuit of the inverter.

* * * * *